United States Patent
Kelly et al.

(10) Patent No.: US 11,811,889 B2
(45) Date of Patent: *Nov. 7, 2023

(54) SYSTEMS AND METHODS FOR RESOLVING AMBIGUOUS TERMS BASED ON MEDIA ASSET SCHEDULE

(71) Applicant: Rovi Guides, Inc., San Jose, CA (US)

(72) Inventors: Timothy Christensen Kelly, Austin, TX (US); Benjamin Maughan, Pleasanton, CA (US); Brian Peterson, Barrington, IL (US); David Yon, Studio City, CA (US); Walter R. Klappert, North Hollywood, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,030

(22) Filed: Dec. 22, 2022

(65) Prior Publication Data

US 2023/0138953 A1    May 4, 2023

Related U.S. Application Data

(63) Continuation of application No. 17/354,295, filed on Jun. 22, 2021, which is a continuation of application No. 16/902,754, filed on Jun. 16, 2020, now Pat. No. 11,076,008, which is a continuation of application No. 16/410,388, filed on May 13, 2019, now Pat. No. 10,728,351, which is a continuation of application No. 15/852,915, filed on Dec. 22, 2017, now Pat. No.
(Continued)

(51) Int. Cl.
G06F 15/173     (2006.01)
H04L 67/50      (2022.01)
H04L 67/306     (2022.01)

(52) U.S. Cl.
CPC .......... *H04L 67/535* (2022.05); *H04L 67/306* (2013.01)

(58) Field of Classification Search
CPC .......................... H04L 67/535; H04L 67/306
See application file for complete search history.

(56) References Cited

U.S. PATENT DOCUMENTS 4,138,719 A    2/1979  Swanstrom et al.
4,509,133 A    4/1985  Monbaron et al.
(Continued)

FOREIGN PATENT DOCUMENTS

JP    H06266779 A    9/1994
JP    H09146972 A    6/1997
(Continued)

OTHER PUBLICATIONS

Anonymous, "Speech recognition", Anonymous: "Speech recognition—Wikipedia", Jan. 31, 2012, (Jan. 31, 2012), XP055700274, Retrieved from the Internet: URL:https://en.wikipedia.org/w/index.php?title=Speech recognition&oldid=4741 61019 [retrieved on Jun. 2, 2020].
(Continued)

*Primary Examiner* — Thanh T Nguyen
(74) *Attorney, Agent, or Firm* — HALEY GUILIANO LLP

(57) ABSTRACT

Systems and methods are disclosed herein to provide information to a user based on a communication from a user associated with multiple media assets. Based on the schedule of the media assets, one is selected and recommended to the user.

18 Claims, 6 Drawing Sheets

Related U.S. Application Data 10,341,447, which is a continuation of application No. 14/610,793, filed on Jan. 30, 2015, now Pat. No. 9,854,049.

(56) References Cited

U.S. PATENT DOCUMENTS

| | | | |
|---|---|---|---|
| 5,859,972 A * | 1/1999 | Subramaniam | G06F 16/258 |
| | | | 707/999.01 |
| 6,006,225 A | 12/1999 | Bowman et al. | |
| 6,021,403 A | 2/2000 | Horvitz et al. | |
| 6,044,347 A | 3/2000 | Abella et al. | |
| 6,064,960 A | 5/2000 | Bellegarda et al. | |
| 6,092,043 A | 7/2000 | Squires et al. | |
| 6,125,345 A | 9/2000 | Modi et al. | |
| 6,144,958 A * | 11/2000 | Ortega | G06F 40/274 |
| | | | 707/999.005 |
| 6,195,635 B1 | 2/2001 | Wright | |
| 6,236,968 B1 | 5/2001 | Kanevsky et al. | |
| 6,256,664 B1 | 7/2001 | Donoho et al. | |
| 6,272,455 B1 | 8/2001 | Hoshen et al. | |
| 6,317,708 B1 | 11/2001 | Witbrock et al. | |
| 6,408,293 B1 | 6/2002 | Aggarwal et al. | |
| 6,671,681 B1 | 12/2003 | Emens et al. | |
| 6,901,366 B1 | 5/2005 | Kuhn et al. | |
| 7,130,923 B2 | 10/2006 | Mason | |
| 7,143,078 B2 | 11/2006 | Doherty et al. | |
| 7,308,404 B2 | 12/2007 | Venkataraman et al. | |
| 7,610,199 B2 | 10/2009 | Abrash et al. | |
| 7,668,865 B2 | 2/2010 | McDonald | |
| 7,716,229 B1 | 5/2010 | Srivastava et al. | |
| 7,725,321 B2 | 5/2010 | Bennett | |
| 7,835,998 B2 | 11/2010 | Aravamudan et al. | |
| 7,856,441 B1 | 12/2010 | Kraft et al. | |
| 7,912,701 B1 | 3/2011 | Gray et al. | |
| 7,930,168 B2 | 4/2011 | Weng et al. | |
| 7,937,272 B2 | 5/2011 | Oomen et al. | |
| 8,005,679 B2 | 8/2011 | Jordan et al. | |
| 8,156,129 B2 | 4/2012 | Zhou et al. | |
| 8,156,138 B2 | 4/2012 | Kohn et al. | |
| 8,315,849 B1 | 11/2012 | Gattani et al. | |
| 8,417,718 B1 | 4/2013 | Finkelstein et al. | |
| 8,494,853 B1 * | 7/2013 | Mengibar | G10L 15/065 |
| | | | 704/235 |
| 8,504,562 B1 | 8/2013 | Ikeda et al. | |
| 8,554,540 B2 | 10/2013 | Lee et al. | |
| 8,713,042 B1 | 4/2014 | Zinenko et al. | |
| 8,756,216 B1 | 6/2014 | Ramesh et al. | |
| 8,805,823 B2 | 8/2014 | Nitz | |
| 8,812,534 B2 | 8/2014 | Platt et al. | |
| 8,880,423 B2 | 11/2014 | Zhang | |
| 8,903,793 B2 | 12/2014 | Bangalore | |
| 8,930,189 B2 | 1/2015 | Cath et al. | |
| 8,954,318 B2 | 2/2015 | Barve et al. | |
| 8,972,388 B1 | 3/2015 | Finkelstein et al. | |
| 9,009,046 B1 | 4/2015 | Stewart | |
| 9,031,216 B1 * | 5/2015 | Kamvar | G10L 15/08 |
| | | | 379/202.01 |
| 9,183,183 B2 | 11/2015 | Barve et al. | |
| 9,251,225 B2 | 2/2016 | Stanfill | |
| 9,424,233 B2 | 8/2016 | Barve et al. | |
| 9,465,833 B2 | 10/2016 | Aravamudan et al. | |
| 9,477,643 B2 | 10/2016 | Barve et al. | |
| 9,542,482 B1 | 1/2017 | Sachan et al. | |
| 9,547,832 B2 | 1/2017 | Gordon | |
| 9,799,328 B2 | 10/2017 | Aravamudan et al. | |
| 10,341,447 B2 | 7/2019 | Kelly et al. | |
| 10,482,674 B1 | 11/2019 | Wu et al. | |
| 10,896,184 B2 | 1/2021 | Aravamudan et al. | |
| 11,423,074 B2 | 8/2022 | Venkataraman et al. | |
| 2001/0049688 A1 | 12/2001 | Fratkina et al. | |
| 2002/0040320 A1 | 4/2002 | Tanaka | |
| 2002/0059069 A1 * | 5/2002 | Hsu | G10L 15/18 |
| | | | 704/E15.018 |
| 2002/0065813 A1 | 5/2002 | Scanlon et al. | |
| 2002/0065884 A1 | 5/2002 | Donoho et al. | |
| 2003/0069879 A1 | 4/2003 | Sloan et al. | |
| 2003/0101047 A1 | 5/2003 | Panttaja | |
| 2003/0101286 A1 | 5/2003 | Kolluri et al. | |
| 2003/0188307 A1 * | 10/2003 | Mizuno | H04N 21/4345 |
| | | | 725/28 |
| 2003/0216912 A1 * | 11/2003 | Chino | G10L 15/22 |
| | | | 704/E15.04 |
| 2004/0019588 A1 | 1/2004 | Doganata et al. | |
| 2004/0194141 A1 | 9/2004 | Sanders | |
| 2005/0049852 A1 | 3/2005 | Chao | |
| 2005/0055321 A1 | 3/2005 | Fratkina et al. | |
| 2005/0080613 A1 | 4/2005 | Colledge et al. | |
| 2005/0246740 A1 * | 11/2005 | Teraci | H04H 60/47 |
| | | | 725/45 |
| 2005/0283468 A1 | 12/2005 | Kamvar et al. | |
| 2006/0074661 A1 | 4/2006 | Takaichi et al. | |
| 2006/0074870 A1 | 4/2006 | Brill et al. | |
| 2006/0110711 A1 | 5/2006 | Julia et al. | |
| 2006/0206454 A1 | 9/2006 | Forstall et al. | |
| 2006/0282776 A1 | 12/2006 | Farmer et al. | |
| 2007/0005570 A1 | 1/2007 | Hurst-Hiller et al. | |
| 2007/0043574 A1 | 2/2007 | Coffman et al. | |
| 2007/0050339 A1 | 3/2007 | Kasperski et al. | |
| 2007/0060099 A1 | 3/2007 | Ramer et al. | |
| 2007/0061334 A1 | 3/2007 | Ramer et al. | |
| 2007/0073540 A1 | 3/2007 | Hirakawa et al. | |
| 2007/0078815 A1 | 4/2007 | Weng et al. | |
| 2007/0136251 A1 | 6/2007 | Colledge et al. | |
| 2007/0192101 A1 | 8/2007 | Braho et al. | |
| 2007/0225980 A1 | 9/2007 | Sumita | |
| 2007/0255702 A1 | 11/2007 | Orme | |
| 2007/0271205 A1 | 11/2007 | Aravamudan et al. | |
| 2008/0010352 A1 | 1/2008 | Donoho et al. | |
| 2008/0091670 A1 | 4/2008 | Ismalon | |
| 2008/0104032 A1 | 5/2008 | Sarkar | |
| 2008/0104037 A1 | 5/2008 | Bierner | |
| 2008/0120072 A1 | 5/2008 | Bartz et al. | |
| 2008/0120093 A1 | 5/2008 | Izumida et al. | |
| 2008/0154611 A1 | 6/2008 | Evermann et al. | |
| 2008/0155701 A1 | 6/2008 | Martinez et al. | |
| 2008/0221866 A1 | 9/2008 | Katragadda et al. | |
| 2008/0235202 A1 | 9/2008 | Wang et al. | |
| 2009/0006343 A1 | 1/2009 | Platt et al. | |
| 2009/0144609 A1 | 6/2009 | Liang et al. | |
| 2009/0198488 A1 | 8/2009 | Vigen | |
| 2009/0210232 A1 | 8/2009 | Sanchez | |
| 2009/0276396 A1 | 11/2009 | Gorman et al. | |
| 2009/0281923 A1 | 11/2009 | Selinger et al. | |
| 2009/0282333 A1 | 11/2009 | Olsen et al. | |
| 2010/0049684 A1 | 2/2010 | Adriaansen et al. | |
| 2010/0057801 A1 | 3/2010 | Ramer et al. | |
| 2010/0094854 A1 | 4/2010 | Rouhani-Kalleh | |
| 2010/0138296 A1 | 6/2010 | Ramer et al. | |
| 2010/0153885 A1 | 6/2010 | Yates | |
| 2010/0185649 A1 | 7/2010 | Zhou et al. | |
| 2011/0066643 A1 | 3/2011 | Cooper et al. | |
| 2011/0066644 A1 | 3/2011 | Cooper et al. | |
| 2011/0066645 A1 | 3/2011 | Cooper et al. | |
| 2011/0071819 A1 | 3/2011 | Miller et al. | |
| 2011/0119282 A1 | 5/2011 | Gorman et al. | |
| 2011/0145224 A1 | 6/2011 | Bangalore | |
| 2011/0179114 A1 | 7/2011 | Dilip et al. | |
| 2011/0179440 A1 | 7/2011 | Anderson et al. | |
| 2011/0209047 A1 | 8/2011 | Olsen et al. | |
| 2012/0016678 A1 | 1/2012 | Gruber et al. | |
| 2012/0124071 A1 | 5/2012 | Gebhard et al. | |
| 2012/0265787 A1 | 10/2012 | Hsu et al. | |
| 2012/0310622 A1 | 12/2012 | Zivkovic et al. | |
| 2013/0054245 A1 | 2/2013 | Chang et al. | |
| 2013/0145385 A1 | 6/2013 | Aghajanyan et al. | |
| 2013/0155068 A1 | 6/2013 | Bier et al. | |
| 2013/0158980 A1 | 6/2013 | Landry et al. | |
| 2013/0179440 A1 | 7/2013 | Gordon | |
| 2013/0185368 A1 | 7/2013 | Nordstrom et al. | |
| 2013/0246430 A1 | 9/2013 | Szucs et al. | |
| 2013/0262501 A1 | 10/2013 | Kuchmann-Beauger et al. | |
| 2013/0297285 A1 | 11/2013 | Kwon et al. | |
| 2013/0332438 A1 | 12/2013 | Li et al. | |

(56) References Cited

U.S. PATENT DOCUMENTS

| | | |
|---|---|---|
| 2014/0006951 A1 | 1/2014 | Hunter |
| 2014/0214401 A1 | 7/2014 | Li et al. |
| 2014/0223481 A1 | 8/2014 | Fundament |
| 2014/0236572 A1 | 8/2014 | Meshulam et al. |
| 2014/0280289 A1 | 9/2014 | Marantz et al. |
| 2014/0280291 A1 | 9/2014 | Collins et al. |
| 2014/0297666 A1 | 10/2014 | Morris |
| 2014/0337370 A1 | 11/2014 | Aravamudan et al. |
| 2014/0337381 A1 | 11/2014 | Aravamudan et al. |
| 2015/0006290 A1 | 1/2015 | Tomkins et al. |
| 2015/0006564 A1 | 1/2015 | Tomkins et al. |
| 2015/0081656 A1 | 3/2015 | Wang et al. |
| 2015/0169701 A1 | 6/2015 | Stekkelpak et al. |
| 2016/0179801 A1 | 6/2016 | Venkataraman et al. |
| 2016/0226984 A1 | 8/2016 | Kelly et al. |
| 2016/0227283 A1 | 8/2016 | Kelly et al. |
| 2016/0342702 A1 | 11/2016 | Barve et al. |
| 2016/0351187 A1 | 12/2016 | Dandekar et al. |
| 2017/0004184 A1 | 1/2017 | Jain et al. |
| 2017/0017719 A1 | 1/2017 | Aravamudan et al. |
| 2017/0060855 A1 | 3/2017 | Song et al. |
| 2017/0136251 A1 | 5/2017 | Sullivan |
| 2017/0140405 A1 | 5/2017 | Gottemukkala et al. |
| 2018/0225013 A1 | 8/2018 | Barrett et al. |
| 2018/0226073 A1 | 8/2018 | Hodge et al. |
| 2018/0260445 A1 | 9/2018 | Aravamudan et al. |
| 2018/0308202 A1 | 10/2018 | Appu et al. |
| 2018/0342174 A1 | 11/2018 | Zhang et al. |
| 2018/0349755 A1 | 12/2018 | Gao et al. |
| 2018/0359477 A1 | 12/2018 | Yang |
| 2019/0051317 A1 | 2/2019 | Aravamudan et al. |
| 2019/0108447 A1 | 4/2019 | Kounavis et al. |
| 2019/0179861 A1 | 6/2019 | Goldenstein et al. |
| 2019/0197357 A1 | 6/2019 | Anderson et al. |
| 2019/0295211 A1 | 9/2019 | Appu et al. |
| 2019/0318648 A1 | 10/2019 | Zhang et al. |
| 2019/0335007 A1 | 10/2019 | Kelly et al. |
| 2020/0110578 A1 | 4/2020 | Miller et al. |
| 2020/0279019 A1 | 9/2020 | Peterson et al. |
| 2020/0351361 A1 | 11/2020 | Kelly et al. |
| 2020/0372117 A1 | 11/2020 | Han et al. |
| 2021/0157813 A1 | 5/2021 | Hammad et al. |
| 2021/0173834 A1 | 6/2021 | Aravamudan et al. |
| 2021/0201932 A1 | 7/2021 | Aravamudan et al. |
| 2021/0314413 A1 | 10/2021 | Kelly et al. |
| 2021/0319048 A1 | 10/2021 | Aravamudan et al. |
| 2023/0019782 A1 | 1/2023 | Barve et al. |
| 2023/0026181 A1 | 1/2023 | Venkataraman et al. |
| 2023/0125513 A1 | 4/2023 | Kelly et al. |
| 2023/0135944 A1 | 5/2023 | Kelly et al. |
| 2023/0205798 A1 | 6/2023 | Aravamudan et al. |
| 2023/0206940 A1 | 6/2023 | Aravamudan et al. |

FOREIGN PATENT DOCUMENTS

| | | |
|---|---|---|
| JP | 2001034292 A | 2/2001 |
| JP | 2001043246 A | 2/2001 |
| JP | 2001100787 A | 4/2001 |
| JP | 2001175680 A | 6/2001 |
| JP | 2002108915 A | 4/2002 |
| JP | 2003058538 A | 2/2003 |
| JP | 2004362280 A | 12/2004 |
| JP | 2006107469 A | 4/2006 |
| JP | 2007511016 A | 4/2007 |
| JP | 2008243047 A | 10/2008 |
| JP | 2009037603 A | 2/2009 |
| JP | 2010205265 A | 9/2010 |
| KR | 101322821 B1 | 10/2013 |
| WO | 9813771 A1 | 4/1998 |
| WO | 02073331 A2 | 9/2002 |
| WO | 2007103938 A2 | 9/2007 |
| WO | 2010093618 A2 | 8/2010 |
| WO | 2011088053 A2 | 7/2011 |
| WO | 2012088590 A1 | 7/2012 |

OTHER PUBLICATIONS

Denis Alexandre, et al., "Resolution of Referents Grouping in Practical Dialogues" 7th Sigdial Workshop on Discourse and Dialogue Jan. 1, 2006, Sydney, Australia.

Kumar Ashwani, et al., Reference resolution as a facilitating process towards robust multimodal dialogue management: A cognitive grammar approach,, Jan. 1, 2003, 8.

U.S. Appl. No. 17/354,295, filed Jun. 22, 2021, Timothy Christensen Kelly, Mar. 11, 2023.

Ninomiya et al., "A Diagramming tool of the conversation for communication support," The Institute of Electronics Information and Communication Engineers, Technical Report of IEICA, IN2004-168, TM2004-91.OIS2004-89 (Jan. 2005) (7 pages).

Jurafsky et al., "Chapter 21: Computational Discourse" In: "Computational Linguistics (Online)", MIT Press, Cambridge, MA, USA (2007) (47 pages).

Venkataraman et al., "A Natural Language Interface for Search and Recommendations of Digital Entertainment Media", IBC 2015 Conference, pp. 1-11, XP055274592 (2015) (11 pages).

U.S. Appl. No. 17/354,295, filed Jun. 22, 2021, Timothy Christensen Kelly.

U.S. Appl. No. 18/087,041, filed Dec. 22, 2022, Timothy Christensen Kelly.

U.S. Appl. No. 18/087,059, filed Dec. 22, 2022, Timothy Christensen Kelly.

U.S. Appl. No. 17/873,912, filed Jul. 26, 2022, Rakesh Barve.

U.S. Appl. No. 17/315,963, filed May 10, 2021, Murali Aravamudan.

U.S. Appl. No. 18/115,466, filed Feb. 28, 2023, Murali Aravamudan.

U.S. Appl. No. 17/122,347, filed Dec. 15, 2020, Murali Aravamudan.

U.S. Appl. No. 18/115,612, filed Feb. 28, 2023, Murali Aravamudan.

* cited by examiner

SYSTEMS AND METHODS FOR RESOLVING AMBIGUOUS TERMS BASED ON MEDIA ASSET SCHEDULE

CROSS-REFERENCE TO RELATED APPLICATION

This application is a continuation application of U.S. patent application Ser. No. 17/354,295, filed Jun. 22, 2021, which is a continuation application of U.S. patent application Ser. No. 16/902,754, filed Jun. 16, 2020, now U.S. Pat. No. 11,076,008, which is a continuation of U.S. patent application Ser. No. 16/410,388, filed May 13, 2019, now U.S. Pat. No. 10,728,351, which is a continuation application of U.S. patent application Ser. No. 15/852,915, filed Dec. 22, 2017, now U.S. Pat. No. 10,341,447, which is a continuation of U.S. patent application Ser. No. 14/610,793, filed Jan. 30, 2015, now U.S. Pat. No. 9,854,049. The disclosures of which are hereby incorporated by reference herein in their entireties.

BACKGROUND

The sheer number of media assets available to users makes it very difficult for users to determine which media assets they will be likely to enjoy, and thus which media assets they should access. To make the determination of which media assets to access easier, users rely on media guidance applications. Media guidance applications may provide information to users in an easily accessed format about media assets that the user is likely to enjoy.

The information provided by media guidance applications may be more useful to users if the information is personalized to each user's preferences, enabling users to more easily obtain information about media assets the users may be interested in. However, a user might find the task of entering his or her preferences into a media guidance application manually to be tedious and time-consuming. Hence, a user may appreciate a media guidance application that can provide information to the user based on the user's communications with other humans.

SUMMARY

Accordingly, methods and systems are disclosed herein for providing information to a user based on the user's communications comprising a first symbol and a second symbol. In some embodiments, a media guidance application may receive a communication from a user. For example, the media guidance application may receive a user's Short Message Service (SMS), Multimedia Messaging Service (MMS), chat message or e-mail to another user.

In some embodiments, the media guidance application may identify a first symbol and a second symbol in the communication. The symbols may be associated with phrases in the communication. For example, a user's communication may be a text message to a friend that says, "Watching a rock band in an outdoor concert was the best!". The media guidance application may identify that the first symbol is "rock band" and the second symbol is "outdoor concert". The media guidance application may determine these symbols using heuristics that allow it to determine phrases relevant to the meaning of a communication.

In some embodiments, the media guidance application may identify a first candidate list of media assets associated with the first symbol. The media guidance application may do this by cross-referencing the contents of a database of media assets with the first symbol and, optionally or additionally, alternate expressions of the first symbol (e.g., synonyms). The media assets in the database may be associated with metadata (e.g., tags) that can be compared to the first symbol and its alternate expressions. For example, the media guidance application may identify "rock band" as a first symbol in the user communication "Watching a rock band in an outdoor concert was the best!". The media guidance application may determine that alternate expressions for the first symbol, "rock band", include "rockers" and "rock musicians". The media guidance application may cross-reference the media assets in a database with the symbol "rock band" and its alternate expressions. The cross-referencing may comprise determining a similarity between the first symbol (and, optionally, its alternate expressions), and the metadata associated with one or more media assets in the database. The result of this cross-referencing may result in a list of videos of rock bands. This list of videos of rock bands may become the first candidate list of media assets.

In some embodiments, the media guidance application may identify a second candidate list of media assets associated with the second symbol. This may be done by using a similar process to the one described as being used to generate the first candidate list of media assets. For example, the media guidance application may identify "outdoor concert" as the second symbol in the above-mentioned user communication. The media guidance application may cross-reference the media assets in a database with the second symbol "outdoor concert" (and optionally, synonyms to "outdoor concert"). The result of this cross-referencing may be a list of videos of outdoor concerts. This list of videos of outdoor concerts may become the second candidate list of media assets.

In some embodiments, the media guidance application may determine a set of media assets identified in both the first candidate list and the second candidate list. This may result in a set of media assets that are particularly relevant to the content of the user's communication. For example, the set of media assets may be determined by identifying common media assets in the first candidate list associated with the symbol "rock band" and the second candidate list associated with the symbol "outdoor concert". This may result in a set of media assets that includes videos about rock bands performing during outdoor concerts.

In some embodiments, the media guidance application may access a profile of the user. In some embodiments, this profile may be retrieved from a database, for example, a database corresponding to a social network that the user belongs to. Additionally, this profile may be created by combining and analyzing data about the user's interactions with the media guidance application. This profile may comprise user interests, user favorites, user preferences, user demographics, user search history, user media asset access history, user information, and the like. For example, the media guidance application may access a user-specific page on a social media website (e.g., a Facebook page) of the user who sent the text message containing the symbols "rock band" and "outdoor concert". The media guidance application may modify a user profile to include information from the user-specific page on the social media website (e.g., the user's Facebook page).

In some embodiments, the media guidance application may determine a media asset of the set of the media assets that matches an attribute of the profile. The attribute of the profile may be any data contained in the profile. For example, the attribute may be a user's favorite musician, a user's television viewing history, or a user's date of birth. The media guidance application may cross-reference data associated with each media asset of the set of media assets to one or more attributes in the user profile. For example, the user profile of the user who sent the text message containing the symbols "rock band" and "outdoor concert" may contain a list of favorite music artists, which may include the band "Red Hot Chili Peppers". The set of media assets identified by the media guidance application may include a video from an outdoor rock concert by this band. The media guidance application may determine that the video of the outdoor concert matches an attribute of the profile, namely that the band performing at the outdoor concert is the same as one of the user's favorite bands.

In some embodiments, the media guidance application may provide the user information relating to the media asset. In some embodiments, the media guidance application may provide this information in response to receiving the communication from the user. For example, when the user sends a text message to a friend stating "Watching a rock band in an outdoor concert was the best!", the media guidance application may responsively generate for display a pop-up on the user's mobile device with information about prices for tickets to an upcoming "Red Hot Chili Peppers" concert, as well as the weather on the day of the concert. In some embodiments, the media guidance application may replace default content with targeted content based on this information. For example, the user may be browsing a website, when the user will notice an advertisement for an upcoming "Red Hot Chili Peppers" concert instead of a default advertisement that would usually appear.

In some embodiments, the media guidance application may generate the set of media assets based on a relationship between the first symbol and the second symbol. This relationship may be based on a common feature of the first symbol and the second symbol. For example, if a user communication says "Watching a rock band in an outdoor concert was the best!", the media guidance application may determine that a first symbol "rock band" and a second symbol "outdoor concert" are related to each other as they are both associated with music. The media guidance application may provide information to the user about media assets associated with music based on the relationship between the first symbol and the second symbol. The media guidance application may generate candidate lists that the first and second symbol may define that include only media assets related to music. Hence, the media asset that matches an attribute of the user profile will be related to music. This media asset may be a video of a rock band performing an outdoor concert.

In some embodiments, the media guidance application may identify a media asset that is related to the determined media asset, and may recommend the related media asset to the user. For example, the media guidance application may determine, using the symbols "New York Times Bestseller" and "wife disappears", that the media asset is the book "Gone Girl". The media guidance application may then identify other books by the same author and recommend these books to the user.

In some embodiments, the media guidance application may determine a correlation value for each media asset in the set of media assets with respect to an attribute of the profile. The correlation value of a media asset may correspond to a value generated by comparing one or more tags associated with a media asset to one or more attributes of the profile. The correlation may describe the likelihood of a tag of a media asset being similar to at least one attribute of the profile. A media asset with a high correlation may have several tags that are closely related to an attribute of the profile. The media guidance application may provide information related to the media asset with the highest correlation value to the user. For example, the user's profile may indicate an interest in "American rock music". A user e-mail may state "I can't stop listening to The Beatles and The Doors". The media guidance application may identify as the first and second symbol respectively the bands "The Beatles" and "The Doors". The set of media assets identified by the media guidance application may include music by the British rock band "The Beatles" and music by the American rock band "The Doors". The media guidance application may associate music by The Beatles with a lower correlation value than the music by the The Doors as the latter may have two tags (i.e. "American" and "rock music") that match the attribute of the profile while the former may only have one (i.e., "rock music").

In some embodiments, the media guidance application may determine a location of the user. The media guidance application may determine the location by extracting location information from a user profile, or by using GPS data associated with a user device. The media guidance application may then identify a vendor based on the media asset and the location of the user. The media guidance application may include information about the vendor in the information provided to the user. For example, the media guidance application may receive a text message from a user that states "Watching a rock band in an outdoor concert was the best!" and determine that the media asset related to the context of this communication is a video of an outdoor concert by the "Red Hot Chili Peppers" using any manner described above or below. The media guidance application may determine the user's location using a GPS of the user's cell phone. The media guidance application may identify that a music shop has inventory that includes albums created by the "Red Hot Chili Peppers". The media guidance application may further determine that the distance from the user location to the vendor is less than a threshold distance, which may be specified by the user or may be determined automatically. The media guidance application may responsively include information about the music shop in the information provided to the user.

Methods and systems are also disclosed herein for providing information to a user based on the user's communications comprising a symbol with a plurality of candidate interpretations. In some embodiments, the media guidance application may receive a communication from a user as described above. In some embodiments, the media guidance application may identify a symbol that is subject to a plurality of candidate interpretations. The media guidance application may identify the plurality of candidate interpretations by querying a database for each known symbol interpretation, and retrieving candidate interpretations that match the symbol. For example, the media guidance application may receive a text message stating "I can't wait to see Michelle together tonight!". The media guidance symbol may determine that the user's text message contains the symbol "Michelle". The media guidance system may further determine that the symbol "Michelle" could refer to either the First Lady Michelle Obama or the actress Michelle Rodriguez. The media guidance application may thereby identify "Michelle Obama" and "Michelle Rodriguez" as candidate interpretations of the symbol "Michelle".

In some embodiments, the media guidance application may compare an attribute of the profile to each candidate interpretation of the plurality of candidate interpretations.

The attribute of the profile may include any of the types of information described above. In some embodiments, the media guidance application may compare one or more attributes of a profile to each candidate interpretation of the plurality of candidate interpretations. For example, after determining that a user text message contains the symbol "Michelle", the media guidance application may determine that the user's profile contains a list of interests, of whom "First Ladies" is one. The media guidance application may compare this attribute of "First Ladies" to each candidate interpretation of the plurality of candidate interpretations. The media guidance application may further compare this attribute to one or more alternate expression associated with each candidate interpretation. For example, the media guidance application may determine that an alternate expression for the candidate interpretation "Michelle Obama" is "First Lady". The media guidance application may compare this alternate expression to the user profile attribute of "First Ladies".

In some embodiments, the media guidance application may determine a meaning of the symbol based on the comparison. The media guidance application may determine the meaning based on determining that the user profile attribute is associated with a candidate interpretation or an alternate expression of a candidate interpretation. For example, based on comparing the user profile attribute "First Ladies" to the alternate expression for "Michelle Obama" of "First Lady", the media guidance application may determine that the meaning of the symbol "Michelle" is Michelle Obama. Determining the meaning of the symbol may enable the media guidance application to provide relevant information to the user. If the user is interested in Michelle Obama, the user will probably not appreciate receiving a recommendation for a movie starring the actress Michelle Rodriguez. Alternatively, if the user likes the actress Michelle Rodriguez, the user will probably not want to receive news about the First Lady. Determining a meaning for the symbol may allow the media guidance application to provide recommendations that are relevant to the user.

In some embodiments, the media guidance application may update the profile to include information based on the determined meaning. For example, based on the determination of a meaning for the symbol "Michelle", the media guidance application may update the list of interests in the user's profile to include an interest in Michelle Obama. In some embodiments, the media guidance application may recommend a media asset to the user based on the determined meaning. For example, the media guidance application may recommend videos of Michelle Obama's past televised interviews to the user. In some embodiments, the media guidance application may provide information in response to the user sending the communication. For example, the media guidance application may generate an overlay of a video of Michelle Obama on top of the user's communication in response to receiving the user's communication. In some embodiments, the media guidance application may replace default content with targeted content. For example, the user may be presented with political advertisements starring Michelle Obama instead of default political advertisements when watching television.

In some embodiments, the media guidance application may determine the meaning of the symbol by determining a correlation value for each candidate interpretation of the plurality of candidate interpretations. As described above, the correlation value of a candidate interpretation may correspond to a value generated by comparing the candidate interpretation and its alternate expressions to the attribute of the profile. The media guidance application may provide information related to the candidate interpretation with the highest correlation value. For example, the media guidance application may determine that a user e-mail states "Kevin is such a versatile actor". The media guidance application may determine that the symbol "Kevin" may correspond to candidate interpretations of actor Kevin Costner and actor Kevin Bacon, among other actors. The media guidance application may determine that the user profile comprises a list of recently watched movies which includes the movie "Waterworld", starring Kevin Costner, and may determine that an alternate expression for the candidate interpretation "Kevin Costner" may be "lead actor in Waterworld." The media guidance application may then compare the alternative expression to the user attribute of "Waterworld" and find the two attributes to be very similar. On the other hand, the media guidance application may determine that the candidate interpretation "Kevin Bacon" is not similar to the user attribute "Waterworld" as the actor Kevin Bacon is not the lead actor in the movie "Waterworld". Based on this comparison, the media guidance application may determine that the candidate interpretation of Kevin Costner has a higher correlation value than the candidate interpretation of Kevin Bacon.

In some embodiments, the media guidance application may determine a location of the user as described above. The media guidance application may identify a vendor based on the location of the user and the determined meaning. For example, based on the results of comparing an alternate expression for "Kevin Costner" and a user profile attribute, the media guidance application may determine that the user symbol "Kevin" means the actor Kevin Costner. The media guidance application may determine the user's home address using information provided by the user on a social networking website. The media guidance application may identify a movie rental store near the user's home that has Digital Video Discs (DVDs) of Kevin Costner movies in stock. The media guidance application may provide information about the identified vendor to the user.

In some embodiments, the media guidance application may associate each of the candidate interpretations with a media asset. For example, if the media guidance application identifies "Star Wars" as a symbol in a transcription of a user voicemail, the candidate interpretations may include the movies in the "Star Wars" series, with each candidate interpretation being associated with a respective movie in the series.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
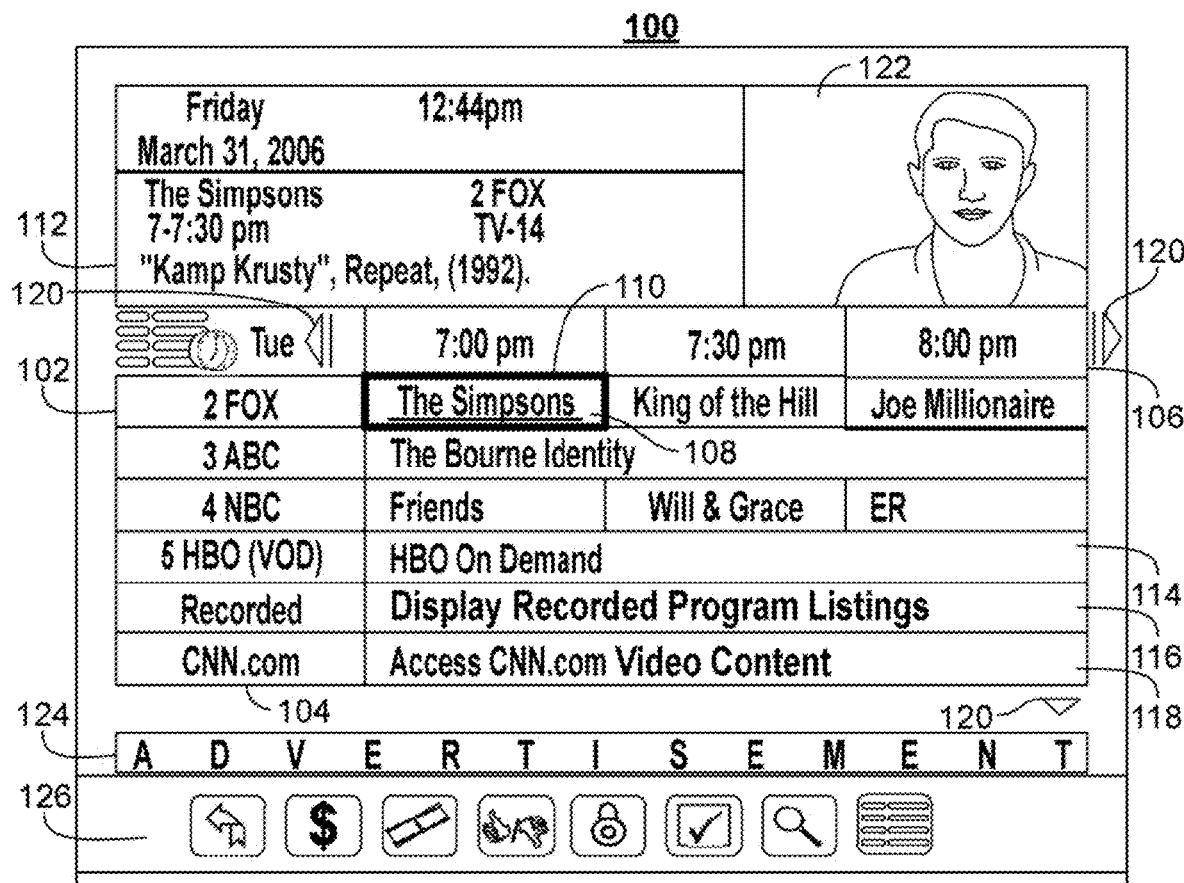
FIG. 1 shows an illustrative example of a display screen generated by a media guidance application in accordance with some embodiments of the disclosure.

Methods and systems are disclosed herein for providing information to a user based on the user's communications comprising a first symbol and a second symbol. In some embodiments, a media guidance application may receive a communication from a user. For example, the media guidance application may receive a user's Short Message Service (SMS), Multimedia Messaging Service (MMS), chat message or e-mail to another user.

In some embodiments, the media guidance application may identify a first symbol and a second symbol in the communication. The symbols may be associated with phrases in the communication. For example, a user's communication may be a text message to a friend that says, "Watching a rock band in an outdoor concert was the best!". The media guidance application may identify that the first symbol is "rock band" and the second symbol is "outdoor concert". The media guidance application may determine these symbols using heuristics that allow it to determine phrases relevant to the meaning of a communication.

Although the media guidance application is described above as identifying a first symbol and a second symbol, the media guidance application may identify any number of symbols and use them in the below embodiments. For example, the media guidance application may identify a first symbol, a second symbol, and a third symbol in a user communication.

In some embodiments, the media guidance application may identify a first candidate list of media assets associated with the first symbol. The media guidance application may do this by cross-referencing the contents of a database of media assets with the first symbol and, optionally or additionally, alternate expressions of the first symbol (e.g., synonyms). The media assets in the database may be associated with metadata (e.g., tags) that can be compared to the first symbol and its alternate expressions. For example, the media guidance application may identify "rock band" as a first symbol in the user communication "Watching a rock band in an outdoor concert was the best!". The media guidance application may determine that alternate expressions for the first symbol, "rock band", include "rockers" and "rock musicians". The media guidance application may cross-reference the media assets in a database with the symbol "rock band" and its alternate expressions. The cross-referencing may comprise determining a similarity between the first symbol (and, optionally, its alternate expressions), and the metadata associated with one or more media assets in the database. The result of this cross-referencing may result in a list of videos of rock bands. This list of videos of rock bands may become the first candidate list of media assets.

In some embodiments, the media guidance application may identify a second candidate list of media assets associated with the second symbol. This may be done by using a similar process to the one described as being used to generate the first candidate list of media assets. For example, the media guidance application may identify "outdoor concert" as the second symbol in the above-mentioned user communication. The media guidance application may cross-reference the media assets in a database with the second symbol "outdoor concert" (and optionally, synonyms to "outdoor concert"). The result of this cross-referencing may be a list of videos of outdoor concerts. This list of videos of outdoor concerts may become the second candidate list of media assets.

In some embodiments, the media guidance application may determine a set of media assets identified in both the first candidate list and the second candidate list. This may result in a set of media assets that are particularly relevant to the content of the user's communication. For example, the set of media assets may be determined by identifying common media assets in the first candidate list associated with the symbol "rock band" and the second candidate list associated with the symbol "outdoor concert". This may result in a set of media assets that includes videos about rock bands performing during outdoor concerts.

In some embodiments, the media guidance application identified may identify any number of candidate lists of media assets, such that each candidate list is associated with an identified symbol. For example, if a media guidance application identifies three symbols in a user communication, the media guidance application may identify three candidate lists of media assets, where each list is associated with one of the three identified symbols. In some embodiments, the media guidance application may determine a set of media assets identified in all the candidate lists of media assets. For example, if the media guidance application generates three candidate lists of media assets, then the media guidance application may determine a set of media assets identified in all three lists.

In some embodiments, the media guidance application may access a profile of the user. In some embodiments, this profile may be retrieved from a database, for example, a database corresponding to a social network that the user belongs to. Additionally, this profile may be created by combining and analyzing data about the user's interactions with the media guidance application. This profile may comprise user interests, user favorites, user preferences, user demographics, user search history, user media asset access history, user information, and the like. For example, the media guidance application may access a user-specific page on a social media website (e.g., a Facebook page) of the user who sent the text message containing the symbols "rock band" and "outdoor concert". The media guidance application may modify a user profile to include information from the user-specific page on the social media website (e.g., the user's Facebook page).

In some embodiments, the media guidance application may determine a media asset of the set of the media assets that matches an attribute of the profile. The attribute of the profile may be any data contained in the profile. For example, the attribute may be a user's favorite musician, a user's television viewing history, or a user's date of birth. The media guidance application may cross-reference data associated with each media asset of the set of media assets to one or more attributes in the user profile. For example, the user profile of the user who sent the text message containing the symbols "rock band" and "outdoor concert" may contain a list of favorite music artists, which may include the band "Red Hot Chili Peppers". The set of media assets identified by the media guidance application may include a video from an outdoor rock concert by this band. The media guidance application may determine that the video of the outdoor concert matches an attribute of the profile, namely that the band performing at the outdoor concert is the same as one of the user's favorite bands.

In some embodiments, the media guidance application may provide the user information relating to the media asset. In some embodiments, the media guidance application may provide this information in response to receiving the communication from the user. For example, when the user sends, using user input interface 310, a text message to a friend stating "Watching a rock band in an outdoor concert was the best!", the media guidance application may responsively generate for display a pop-up on the user's mobile device's display 312 with information about prices for tickets to an upcoming "Red Hot Chili Peppers" concert, as well as the weather on the day of the concert. In some embodiments, the media guidance application may replace default content with targeted content based on this information. For example, the user may be browsing a website, when the user will notice an advertisement for an upcoming "Red Hot Chili Peppers" concert instead of a default advertisement that would usually appear.

Methods and systems are also disclosed herein for providing information to a user based on the user's communications comprising a symbol with a plurality of candidate interpretations. In some embodiments, the media guidance application may receive a communication from a user as described above. In some embodiments, the media guidance application may identify a symbol that is subject to a plurality of candidate interpretations. The media guidance application may identify the plurality of candidate interpretations by querying a database for each known symbol interpretation, and retrieving candidate interpretations that match the symbol. For example, the media guidance application may receive a text message stating "I can't wait to see Michelle together tonight!". The media guidance symbol may determine that the user's text message contains the symbol "Michelle". The media guidance system may further determine that the symbol "Michelle" could refer to either the First Lady Michelle Obama or the actress Michelle Rodriguez. The media guidance application may thereby identify "Michelle Obama" and "Michelle Rodriguez" as candidate interpretations of the symbol "Michelle".

Although the media guidance application is described above as identifying a first symbol subject to a plurality of candidate interpretations, the media guidance application may identify any number of symbols. For example, the media guidance application may identify a first symbol subject to a first plurality of candidate interpretations and a second symbol subject to a second plurality of candidate interpretations. In some embodiments, the media guidance application may determine the meaning of a first symbol, and then determine the meaning of a second symbol, and so on until the meaning of all symbols subject to a plurality of candidate interpretations has been determined.

In some embodiments, the media guidance application may compare an attribute of the profile to each candidate interpretation of the plurality of candidate interpretations. The attribute of the profile may include any of the types of information described above. In some embodiments, the media guidance application may compare one or more attributes of a profile to each candidate interpretation of the plurality of candidate interpretations. For example, after determining that a user text message contains the symbol "Michelle", the media guidance application may determine that the user's profile contains a list of interests, of whom "First Ladies" is one. The media guidance application may compare this attribute of "First Ladies" to each candidate interpretation of the plurality of candidate interpretations. The media guidance application may further compare this attribute to one or more alternate expression associated with each candidate interpretation. For example, the media guidance application may determine that an alternate expression for the candidate interpretation "Michelle Obama" is "First Lady". The media guidance application may compare this alternate expression to the user profile attribute of "First Ladies".

In some embodiments, the media guidance application may determine a meaning of the symbol based on the comparison. The media guidance application may determine the meaning based on determining that the user profile attribute is associated with a candidate interpretation or an alternate expression of a candidate interpretation. For example, based on comparing the user profile attribute "First Ladies" to the alternate expression for "Michelle Obama" of "First Lady", the media guidance application may determine that the meaning of the symbol "Michelle" is Michelle Obama. Determining the meaning of the symbol may enable the media guidance application to provide relevant information to the user. If the user is interested in the Michelle Obama, the user will probably not appreciate receiving a recommendation for a movie starring the actress Michelle Rodriguez. Alternatively, if the user likes the actress Michelle Rodriguez, the user will probably not want to receive news about the First Lady. Determining a meaning for the symbol may allow the media guidance application to provide recommendations that are relevant to the user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
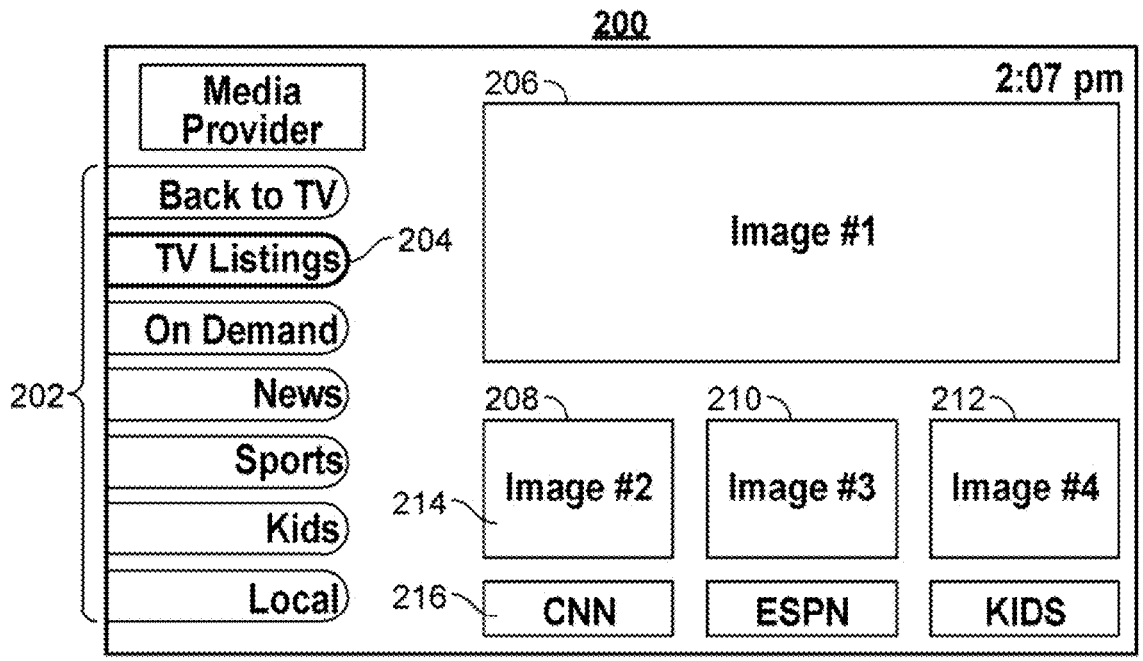
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
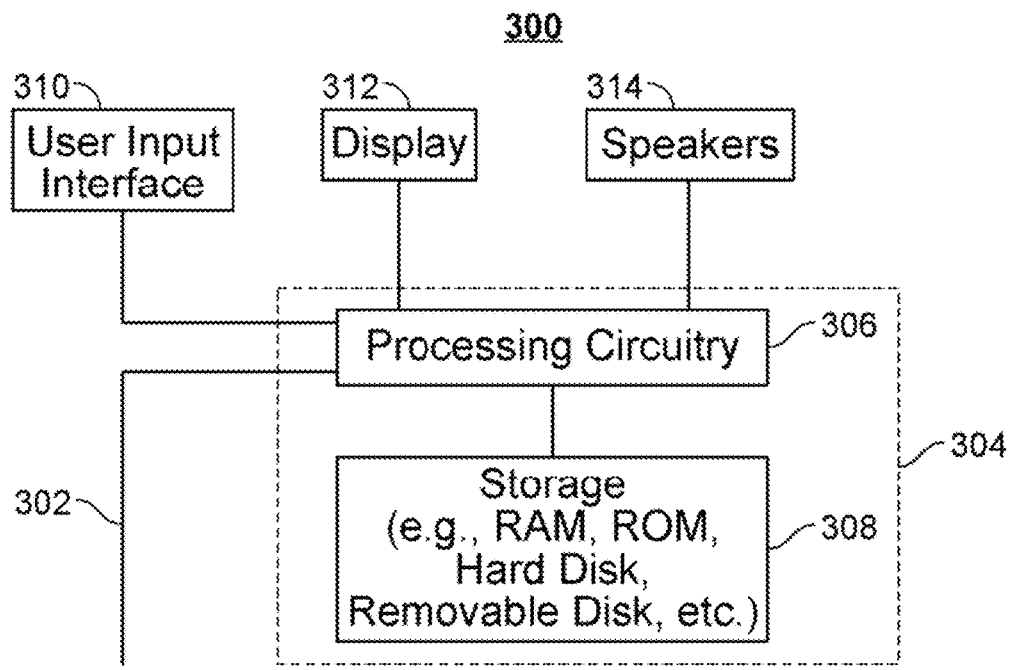
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
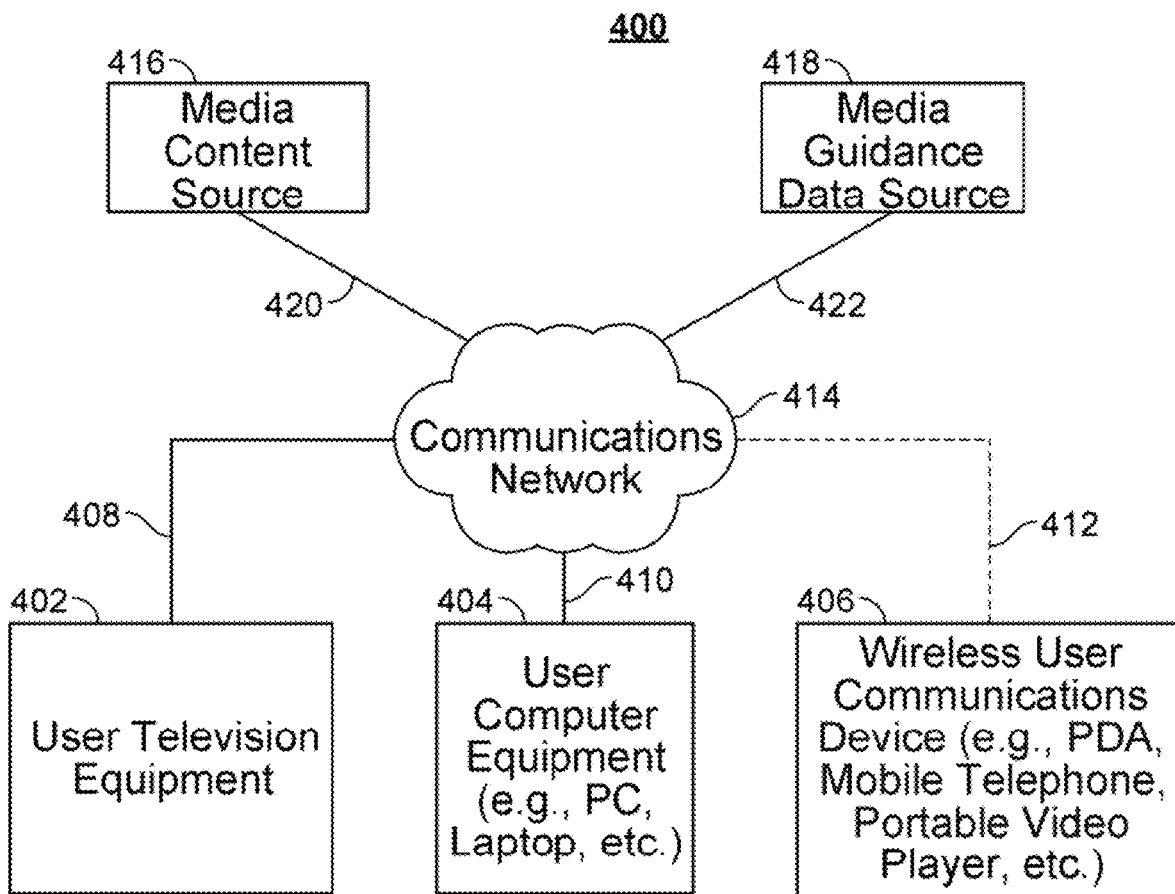
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired).

Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412.

Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
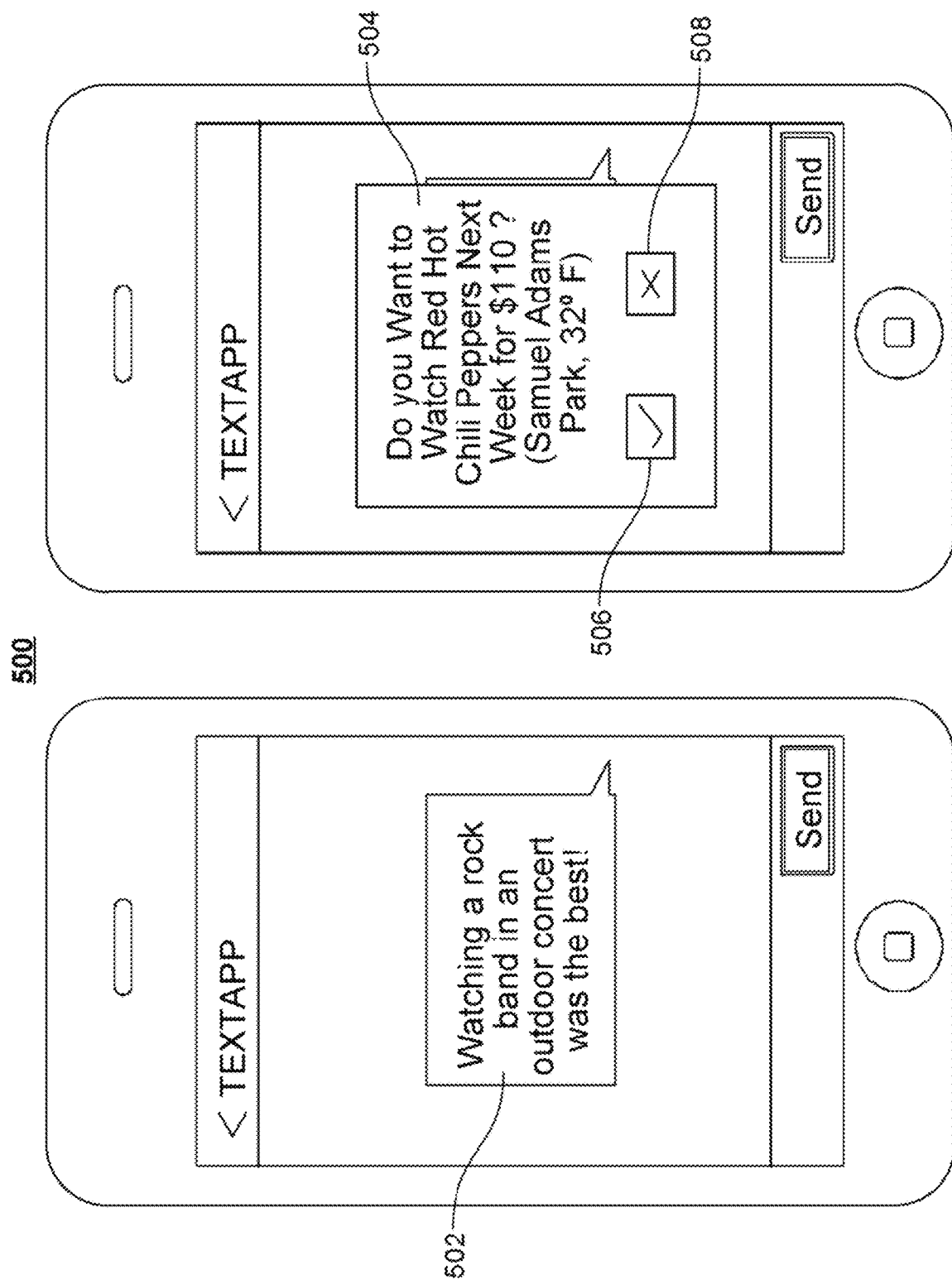
FIG. 5 shows an illustrative embodiment of user equipment on which a communication from the user and information provided by the media guidance application is displayed in accordance with some embodiments of the disclosure.

FIG. 5 shows an illustrative embodiment of user equipment on which a communication from the user and information provided by the media guidance application is displayed in accordance with some embodiments of the disclosure. User equipment 500, which is shown with two alternative displays, is demonstrated as a touchscreen smartphone device, but may be implemented on any user equipment device, such as user television equipment 402, user computer equipment 404, or wireless user communications device 406.

In some embodiments, the media guidance application may receive a communication, such as communication 502, from a user. As referred to herein, a communication may include any transmission of information from one user to another. For example, a communication may include an e-mail, text message, chat message, a picture, a voice message, a video, a SMS (Short Message Service), a MMS (Multimedia Messaging Service), a tweet, a status update on a social network and a recommendation. A communication may also comprise any transmission of information through a communications network 414 from one user to multiple users. Communication 502 may be created by a user through the user input interface 310 on any of the user devices 402, 404, and/or 406, and may be displayed by way of display 312. For example, a media guidance application may receive communication in the form of a communication 502 stating "Watching a rock band in an outdoor concert was the best!" that is sent by a user to a friend.

In some embodiments, the media guidance application may identify, using processing circuitry 306, a first symbol and a second symbol of communication 502. As referred to herein, a symbol may include any portion of communication 502. For example, the symbol may be a phrase from an e-mail, SMS, or MMS. The symbol may be a video clip from a video or a voice clip from a voice message. The symbol may be a textual representation of a portion of a video or a voice message. The media guidance application may identify a symbol that represents a subject of communication 502, or is a relevant phrase in communication 502.

A media guidance application may determine a first symbol and a second symbol by searching for certain keywords in a user communication 502. In some embodiments, the keywords may comprise any proper nouns in the user communication 502, including names of people and names of places. For example, a media guidance application may receive a user text message "I want to see the Sphinx in Egypt" and identify a first symbol "Sphinx" and second symbol "Egypt". In some embodiments, the media guidance application may identify a first symbol and a second symbol based on the frequency of symbols in the user communication 502. For example, a media guidance application may receive an e-mail reciting a recipe for making cake in which the words "eggs" and "flour" are mentioned often, and identify a first symbol "eggs" and a second symbol "flour". In some embodiments, the media guidance application may use information from media guidance data source 418 to identify a first symbol and a second symbol. For example, the media guidance data source 418 may provide information to the media guidance application that the television shows "24" and "Lost" are extremely popular, and the media guidance application may use this information to identify in a user text message "I can't believe 24 and Lost are off-air now" a first symbol "24" and a second symbol "Lost".

The media guidance application may use proximity to determine the first symbol and the second symbol. As referred to herein, proximity refers to the distance between an occurrence of the first symbol in the communication 502 and an occurrence of the second symbol in the communication 502. Proximity may be measured in a manner specific to the medium of communication. For example, proximity for e-mail messages may be measured by determining if the first symbol and the second symbol occur in the same sentence or in the same paragraph of communication 502, while proximity for voice messages may be measured by determining that the first symbol is spoken within a certain time duration of the second symbol. The media guidance application may use a threshold proximity to identify symbols that are within a certain distance of each other. As referred to herein, a threshold proximity between two symbols may refer to the fact that two text symbols occur within a pre-specified distance of each other. For example, the media guidance application may define a threshold such that two text symbols must be in the same sentence, or in the same paragraph. A threshold proximity may require spoken symbols from a voice message or visual symbols from a video message to be within a certain time of each other. For example, the media guidance application may define a threshold such that two spoken symbols in a voice mail must be spoken within five seconds of each other. The media guidance application may determine that the first symbol and the second symbol refer to the same media asset based on the proximity of the first symbol and the second symbol in the communication 502 being above the threshold proximity. For example, the media guidance application may use processing circuitry 306 to determine that the user communication 502 "Watching a rock band in an outdoor concert was the best!" contains a first symbol "rock band" and a second symbol "outdoor concert" in the same sentence. The media guidance application may select these two symbols based on a threshold proximity of symbols in a sentence, for example, a threshold specifying to identify symbols that occur in the same sentence. Because the two identified symbols appear in the same sentence of the user communication 502, the media guidance application may determine that both symbols refer to an event where a rock band performed an outdoor concert.

In some embodiments, the media guidance application may identify alternate expressions for the identified symbols. As referred to herein, alternate expressions refer to any phrase that has the same general meaning as a symbol but does not consist of the same words as the symbol. In some embodiments, the media guidance application may query an internal database in storage 308 that contains alternate expressions for various symbols. In some embodiments, the media guidance application may use communications network 414 to access a dictionary or a reference document stored remotely (e.g., at media guidance data source 418) to determine alternate expressions for a symbol. For example, the media guidance application may identify the first symbol "rock band" and then identify its alternate expressions "rock musicians" and "rockers" querying a an online dictionary through communications network 414.

In some embodiments, the media guidance application may identify, using processing circuitry 306, a first candidate list of media assets that the first symbol may define. The media guidance application may use a database of media assets to identify a subset of media assets that match a characteristic of the first symbol. Each media asset in the database of media assets may be associated with metadata that describes the media asset. For example, the metadata may comprise tags, or a description of the media asset that includes information about a media asset's actors, directors, producers, title, release date, revenue, reviews, and the like. As referred to herein, the term "tags" refers to content and metadata identifiers associated with the media assets. The tags may be generated by the media guidance application by using tags added by users and editors to media content source 416 and media guidance data source 418. The media guidance application may parse information created by users for media assets to create tags. For example, the media guidance application may create tags of "awesome", "thrilling", and "spy" with James Bond movies in the media asset database based on phrases commonly found in user reviews of James Bond movies. The media guidance application may use information provided by users to associate tags with certain portions of a media asset. For example, the media guidance application may associate the ending of a James Bond movie with the tag "exciting" based on user reactions to the end of the movie. The media guidance application may parse these reactions from user-provided information such as hash tags, movie reviews, comments on online forums, and the like.

In some embodiments, the media guidance application may automatically assign tags to media assets. The media guidance application may add tags to the media asset that contain the title of the media asset, its participants, its year of creation, and other such data. The media guidance application may receive this information from media guidance data source 418.

The process of identifying the subset of media assets may include comparing the tags associated with each media asset with the first symbol. Additionally, the media guidance application may compare the tags associated with each media asset to alternate expressions of the first symbol. A media asset may be added to an identified subset of media assets if one or more of the tags associated with the media asset match the symbol on one of its alternate expressions. The identified subset of media assets may be the first candidate list of media assets. In some embodiments, the database may be stored locally as part of the media guidance application on the storage circuitry 308. In some embodiments, the database may be stored on a remote location like the media guidance data source 418 that is accessible by the media guidance application. The database may be automatically updated to ensure it contains information about media assets as they become available. For example, using the first symbol "rock band" from the user communication 502 "Watching a rock band in an outdoor concert was the best!", the media guidance application may access a database of videos to determine a subset of videos that the first symbol "rock band" may define. Each video in the database may contain tags that describe its contents. The media guidance application may create a subset of all videos whose tags refer to rock bands. This subset of videos may be a first candidate list of media assets.

In some embodiments, the media guidance application may identify a second candidate list of media assets that the second symbol may define. The media guidance application may follow a similar process to create both the first candidate list and the second candidate list. For example, using the second symbol "outdoor concert" from the user text message, the media guidance application may create a second candidate list of videos associated with tags of "outdoor concert" that the second symbol may define.

In some embodiments, the media guidance application may determine, using processing circuitry 306, a set of media assets identified in both the first candidate list and the second candidate list. By determining media assets common to both candidate lists, the media guidance application may determine a set of media assets closely related to the subject of the user's communication 502. For example, the media guidance application may determine a set of media assets identified in both the first candidate list associated with the first symbol "rock band" and the second candidate list associated with the second symbol "outdoor concert". This set of media assets may comprise videos of outdoor concerts by rock bands. This set of media assets may be more relevant to the subject of the user's communication 502 than videos solely about rock bands or movies videos about outdoor concerts.

In some embodiments, the media guidance application may access a profile of the user. The profile may be stored in a remote location (e.g., media guidance data source 418), and the media guidance application may access it using communications network 414. The profile may be stored locally in storage circuitry 308, and the media guidance application may access it using processing circuitry 306. As referred to herein, a profile of the user refers to a collection of information about the user. For example, a profile may include a list of television shows the user has watched, information provided by the user on a social networking website, a list of the user's interests on a website, a list of ratings the user has given to different media assets, and the like. Further discussion regarding profiles may be found above and below. In some embodiments, the media guidance application may access a profile of the user that the user has created, such as information used to populate a profile page on a social networking website through communications network 414. In some embodiments, the media guidance application may create or update a user profile stored in storage circuitry 308 by monitoring a user's activity; for example, the media guidance application may create a list of movies and television shows the user has accessed in the past year. In some embodiments, the media guidance application may create or update a user profile by combining user data from many sources such as social networking websites and the user's browsing history on any of user devices 402, 404, and/or 406. For example, the media guidance application may create a user profile by combining data associated with user interests, user favorites, user preferences, user demographics, user search history, user media asset access history, and user information. In some embodiments, a user may be able to access and modify the user profile used by the media guidance application using a user device 402, 404, and/or 406. A user may access the user profile by entering identifying information, such as a username and password, into the user input interface 310 to prove authorization. The user may then add, delete, and view attributes of the user profile.

In some embodiments, the media guidance application may determine, using processing circuitry 306, a media asset of the set of media assets that matches an attribute of the profile. The media guidance application may determine that a media asset matches an attribute of the profile if the media asset is associated with a tag that is similar to the attribute of the profile. The media guidance application may determine this similarity by comparing the words in the tag and the attribute. The media guidance application may determine a media asset which may be relevant to the user's interests as it may be related to both the content of the user's communication 502 and one or more attributes of the user profile. For example, the media guidance application may access a list of the user's favorite music artists and determine that the user has listed "Red Hot Chili Peppers" as a favorite artist. The media guidance application may determine that the attribute "Red Hot Chili Peppers" hence matches an attribute of the user profile. In some embodiments, if the media guidance application determines that none of the media assets in the set of media assets match an attribute of the user profile, the media guidance application may select a different attribute and determine if any media assets in the set of media assets match that different attribute. The media guidance application may continue selecting different attributes of the user's profile until a media asset has been determined.

In some embodiments, the media guidance application may select an attribute from a plurality of attributes from a profile of the user based on the time of update of the attribute. For example, if a user profile comprises a list of movies watched by the user, the media guidance application may select a recently watched movie as the attribute to be cross-referenced with the set of media assets instead of a movie watched long ago. In some embodiments, the media guidance application may select an attribute based on the frequency of occurrence of the attribute. For example, a user profile may comprise a list of television shows recorded by the user. The media guidance application may select a show that is frequently recorded by the viewer as the attribute instead of a show that is rarely recorded by the user. In some embodiments, an attribute may be randomly or pseudo-randomly selected by the media guidance application from the profile of the user. In some embodiments, the media guidance application may randomly select an attribute in response to determining that another method of selecting an attribute resulted in an unclear determination of which attribute to select.

In some embodiments, the media guidance application may provide information relating to the media asset to the user. As referred to herein, providing information may include any means of presenting information to a user on any user device. For example, providing information may comprise providing a display 312 through an overlay, pop-up 504, or notification. Providing information may also comprise creating an advertisement on a webpage, embedding a link in the user's communication 502, or generating for display a commercial or other advertisement during video-on-demand or broadcast programming on display 312. Providing information may also comprise providing information through a voice message or video that uses display 312 and/or speakers 314. In some embodiments, the information may be provided in response to the media guidance application receiving the user communication 502. For example, in response to receiving a text message including the content of communication 502, "Watching a rock band in an outdoor concert was the best!", the media guidance application may determine that information about an upcoming outdoor concert by the "Red Hot Chili Peppers" should be presented to the user. The media guidance application may present a pop-up 504 to the user after the user sends, using user input interface 310, the communication 502, where the pop-up 504 includes information about an upcoming outdoor concert, the location of the concert ("Samuel Adams Park"), and the expected temperature during the concert ("32° F."). In some embodiments, the media guidance application may replace default advertisements with targeted advertisements based on the determined media asset. For example, the media guidance application may replace default television advertisements about carbonated drinks with targeted advertisements about the upcoming "Red Hot Chili Peppers" concert when the user watches television. Pop-up 504 may be a confirmation screen, a notification, an advertisement, a text display, a video display, or an icon displayed via display 312. In some embodiments, pop-up 504 may be a sound that is output through speakers 314. Pop-up 504 may include a plurality of information. A user may be able to cycle through the plurality of information in pop-up 504 by using voice commands, text commands, or touch gestures. For example, pop-up 504 may include three advertisements, of which only one appears on display 312. The user may be able to access the advertisements not currently on display 312 by using touch gestures like swiping left or right through user input interface 310.

In some embodiments, the media guidance application may determine, using processing circuitry 306, a media asset of the set of media assets that matches the attribute of the profile by determining a correlation between an attribute of each media asset of the set of media assets and the attribute of the profile. The media guidance application may identify the media asset with the highest correlation of the set of media assets and determine that this media asset may be most relevant to the attribute of the user profile. As referred to herein, correlation may be computed based on a similarity metric. The similarity metric may assign a value to the similarity between two attributes, with a higher value assigned to attributes that are more similar. The similarity metric between two attributes may be calculated by comparing the definitions of two attributes, their frequency of co-occurrence, an overlap in the groups these attributes can be applied to, or any combination of the foregoing. The value of a correlation between an attribute of a media asset and an attribute of a user profile may be high if the two attributes are similar. For example, the media guidance application may determine that a user profile indicates an interest in the band "Red Hot Chili Peppers". In response to receiving communication 502, the media guidance application may determine two candidate lists of media assets, one with videos about rock bands and one with videos about outdoor concerts, in any manner described above or below. The media guidance application may then determine a set of media assets present in both lists comprising videos about rock bands performing outdoor concerts. The media guidance application may compare an attribute of these videos about rock bands performing outdoor concerts to the user profile attribute. The media guidance application may determine that videos featuring one or more members from the band "Red Hot Chili Peppers" have a higher correlation as they are more similar to the user profile attribute than videos featuring members from other rock bands.

The media guidance application may identify and provide recommendations about a media asset that is related to the determined media asset. The media guidance application may determine that a media asset is related to the determined media asset based on information retrieved from a database such as media guidance data source 418 and/or media content source 416. In some embodiments, the media guidance application may do this in response to determining that the user has already accessed the determined media asset. The media guidance application may retrieve data about the user's previously accessed media assets from the user profile. For example, the media guidance application may determine that a user communication 502 on a social networking website (e.g. a Facebook status update) contains the text "I can't wait to watch the Charlie Brown Christmas movie!" and identify the first and second symbols "Charlie Brown" and "Christmas movie". The media guidance application may then create candidate lists of media assets associated with both symbols and determine a set of media assets common to both lists. Of this set, the media guidance application may determine that the movie "A Charlie Brown Christmas" matches an attribute of the profile. The media guidance application may then determine that the user has previously watched the movie "A Charlie Brown Christmas". Hence, the media guidance application may present recommendations about media assets related to the movie that the user has not previously accessed. For example, the media guidance application may provide a recommendation for the related movie "It's the Great Pumpkin Charlie Brown!". In some embodiments, the media guidance application may recommend related media assets (e.g., via pop-up 504) in response to determining that the determined media asset cannot be accessed by the user. The media guidance application may determine the media asset cannot be accessed based on information from the media guidance data source 418. For example, after receiving communication 502 (e.g., a user e-mail) stating "I can't wait to watch the Charlie Brown Christmas movie!" and determining that the movie "A Charlie Brown Christmas" matches an attribute of the user profile, the media guidance application may determine that the user cannot access "A Charlie Brown Christmas", as it is not scheduled for broadcast. The media guidance application may identify the similar animated media asset "It's the Great Pumpkin Charlie Brown" and recommend this to the user (e.g., by way of pop-up 504).

In some embodiments, the media guidance application may determine a location of the user and identify a vendor based on the location and the media asset. As referred to herein, vendor refers to a seller with a physical storefront whose inventory includes media assets or merchandise related to media assets. For example, the vendor may include a book store, a music store, a movie store, a movie rental box, a movie theatre, or an event location. The vendor may be identified based on the vendor's geographical proximity to the location of the user. The media guidance application may find a vendor such that the distance from the user location to the vendor is less than a threshold distance, where the threshold distance may be automatically set or may be modified by the user. The vendor may further be identified based on whether the vendor's inventory includes merchandise related to the media asset. For example, after receiving communication 502, the media guidance application may determine the user location and use this information to identify a store near the user that sells merchandise related to "Red Hot Chili Peppers". The media guidance application may then determine if the store presently has "Red Hot Chili Peppers" merchandise in stock, and recommend the store to the user if the merchandise is in stock (e.g., by way of pop-up 504). In some embodiments, the media guidance application may recommend more than one vendor to a user and rank the recommendations in order of distance from the user or the status of the inventory (e.g., stock is plentiful, store is almost sold out, and the like). Systems and methods for identifying vendors based on user location are more fully described in U.S. patent application Ser. No. 11/323,539 filed Dec. 29, 2005, now abandoned, the entire contents of which this application hereby incorporates by reference herein.

In some embodiments, the media guidance application may display, on display 312, pop-up 504 with buttons 506 and 508. The user may select buttons 506 and 508 using user input interface 310. The media guidance application may provide options to allow the user to buy tickets for the concert by selecting the button 506, or close the pop-up 504 by selecting the button 508. Closing the pop-up 504 by selecting the button 508 may return the user to the previous screen. It is understood that pop-up 504 may be implemented as a notification, indication, or message depending on which type of user equipment 402, 404, or 406 that the media guidance application provides the information. For example, if the user device is a television, the media guidance application may provide the information as a message notification in a corner of the screen.

In some embodiments, button 506 may be a "like" button and button 508 may be a "dislike" button. The media guidance application may determine that a user likes information provided in pop-up 504 if a user selects the "like" button 506. The media guidance application may then provide similar information to the user in the future. The media guidance application may determine that the user did not like the information in pop-up 504 if a user selects the "dislike" button 508. The media guidance application may responsively remove the information from pop-up 504, and/or not provide similar information to the user in the future, or may reduce the likelihood of providing similar information in the future.

In some embodiments, the user may select button 506 to share the information with the user's friends. The media guidance application may, in response to determining the user selected button 506, use the communications network 414 to send the information to the user's social media page so it can be seen by the user's friends. The media guidance application may also create a user communication 502 with the information from the pop-up 504 when the user selects button 506. The user may then send this user communication 502 created by the media guidance application to a friend or share it through a social networking website.

In some embodiments, the media guidance application may receive communication 502 from the user through user input interface 310 as described above. The media guidance application may identify a symbol of the communication 502 that is subject to a plurality of candidate interpretations. The media guidance application may have to determine the user's intended interpretation of the symbol to be able to provide accurate targeted information to the user. As referred to herein, candidate interpretations refer to interpretations of the symbol that are accurate, but not necessarily intended by the user. For example, the media guidance application may receive a text message similar to communication 502, except with text stating "Michelangelo is great!". "Michelangelo" is a name that may refer to either a painter or a Teenage Mutant Ninja Turtle. Hence, the media guidance application may determine that Michelangelo is a symbol with a plurality of candidate interpretations. While both candidate interpretations of the symbol "Michelangelo" are correct, the user may only intend one of the possible interpretations to apply in the context of the user's communication 502. The user's intended interpretation may be determined by the media guidance application by using information from the user's profile.

A media guidance application may determine candidate interpretations for a symbol by querying a reference (e.g. a dictionary or an encyclopedia) for the symbol. The media guidance application may query a local reference stored in storage circuitry 308, or a remote reference accessed through communications network 414. The media guidance application may also store, in storage circuitry 308, a list of commonly encountered symbols with multiple candidate interpretations. The media guidance application may determine that a symbol is subject to a plurality of candidate interpretations by determining that multiple media assets in a database, stored in storage circuitry 308, correspond to the symbol.

In some embodiments, the media guidance application may identify, using processing circuitry 306, each candidate interpretation of the plurality of candidate interpretations. For example, upon receiving the text "Michelangelo is great" and identifying the symbol "Michelangelo" has multiple candidate interpretations, the media guidance application may identify each candidate interpretation in the database that may be a possible interpretation for "Michelangelo".

In some embodiments, the media guidance application may retrieve, using communications network 414, a profile of the user from a local storage 308, or a remote storage through communications network 414. In some embodiments, the media guidance application may compare an attribute of the profile to each candidate interpretation of the plurality of candidate interpretations. For example, the media guidance application may determine that the user's social media webpage (e.g., MySpace profile page) lists "TMNT" (Teenage Mutant Ninja Turtles) in its "Interests" category. The media guidance application may select "TMNT" as the attribute from the user profile. The media guidance application may determine if any of the plurality of candidate interpretations containing "Michelangelo" are associated with the user profile attribute of "TMNT". In some embodiments, the media guidance application may use information available on the Internet through communications network 414, (e.g., located at media guidance data source 418, or media content source 416) to determine if a candidate interpretation matches the attribute. The media guidance application may use these sources to determine if a candidate interpretation is associated with a media asset. For example, the media guidance application may query the media guidance data source 418 through the communications network 414 to determine that Michelangelo the Teenage Mutant Ninja Turtle is associated with the acronym "TMNT" as this character was in a movie called "TMNT". Also, the media guidance application may determine that Michelangelo, the Italian painter, is associated with the Sistine Chapel as he painted the chapel. The media guidance application may use this information to determine if an attribute of the user profile matches a candidate interpretation. In this case, the user profile attribute "TMNT" will match the candidate interpretation of Michelangelo from the media asset Teenage Mutant Ninja Turtles.

In some embodiments, the media guidance application may determine, using processing circuitry 306, a meaning of the symbol based on the comparison. The media guidance application may determine the meaning of the symbol is one of the candidate interpretations based on determining that the chosen candidate interpretation matches an attribute of the profile of the user. For example, the media guidance application may determine that the user profile contains an attribute "TMNT" that matches the candidate interpretation Michelangelo, the Teenage Mutant Ninja Turtle. The media guidance application may use this information to determine that the meaning of the symbol "Michelangelo" is a Teenage Mutant Ninja Turtle.

In some embodiments, the media guidance application may update the profile to include information based on the determined meaning. As referred to herein, information refers to data associated with a media asset. Information may include media asset recommendations, offers for purchasing tickets to access media assets, event recommendations, trivia, cast details, plot details, and a list of the user's friends who are interested in a media asset. Information may also include the time and date associated with the media asset, a weather associated with the media asset, and a location associated with the media asset. This user profile may be used by the media guidance application in the future to determine an attribute of a user profile. In some embodiments, this user profile may be used by the media guidance application to generate future recommendations for the user. For example, after receiving communication 502 including the text of "Michelangelo is great!", the media guidance application may generate for display pop-up 504 on the user equipment 500 by way of display 312, with text displaying information about ticket prices for the movie "TMNT" at a local movie theatre. In some embodiments, the recommendation may replace a default advertisement that would have been displayed to the user. For example, when the user searches for local movie theatre on a search engine, a targeted advertisement may be displayed on display 312 to the user that displays information about "TMNT" playing at a local movie theatre. A user may also receive an audio recommendation about the movie through speakers 314.

In some embodiments, the media guidance application may determine a correlation between an attribute of each candidate interpretation of the plurality of candidate interpretations and the attribute of the profile to identify the candidate interpretation with the highest correlation. The correlation may be determined using any manner described above or below. The media guidance application may determine the meaning of the symbol based on the candidate interpretation with the highest correlation. This will allow the media guidance application to determine a meaning of the symbol that is relevant to the attribute in the user profile.

In some embodiments, each candidate interpretation may be associated with a media asset. In these embodiments, determining a meaning of the symbol may comprise determining the media asset that the symbol refers to. For example, a user may send, using user input interface 310, a communication 502 (e.g., a tweet on Twitter) stating "I loved watching the Oscars." Because the Oscars are an award show that is presented every year, the media guidance application may determine that there are multiple recorded award shows that the symbol "Oscars" could correspond to. The media guidance application may identify that "Oscars" could have candidate interpretations of Oscars 2000, Oscars, 2001, Oscars 2002, and so on. Here, each candidate interpretation is associated with a broadcast recording of the Oscars award show. The media guidance application may identify a user profile attribute, through the user's viewing history, of having watched a re-run of Oscars 2012 last week. Hence, after the attributes of the candidate interpretations have been compared to an attribute of the user profile, the meaning of "Oscars" may be determined to be the Oscars 2012 broadcast.

In some embodiments, the media guidance application may determine, using processing circuitry 306, a location of the user and identify a vendor based on the location and inventory at the vendor, as described above.

Figure 6:
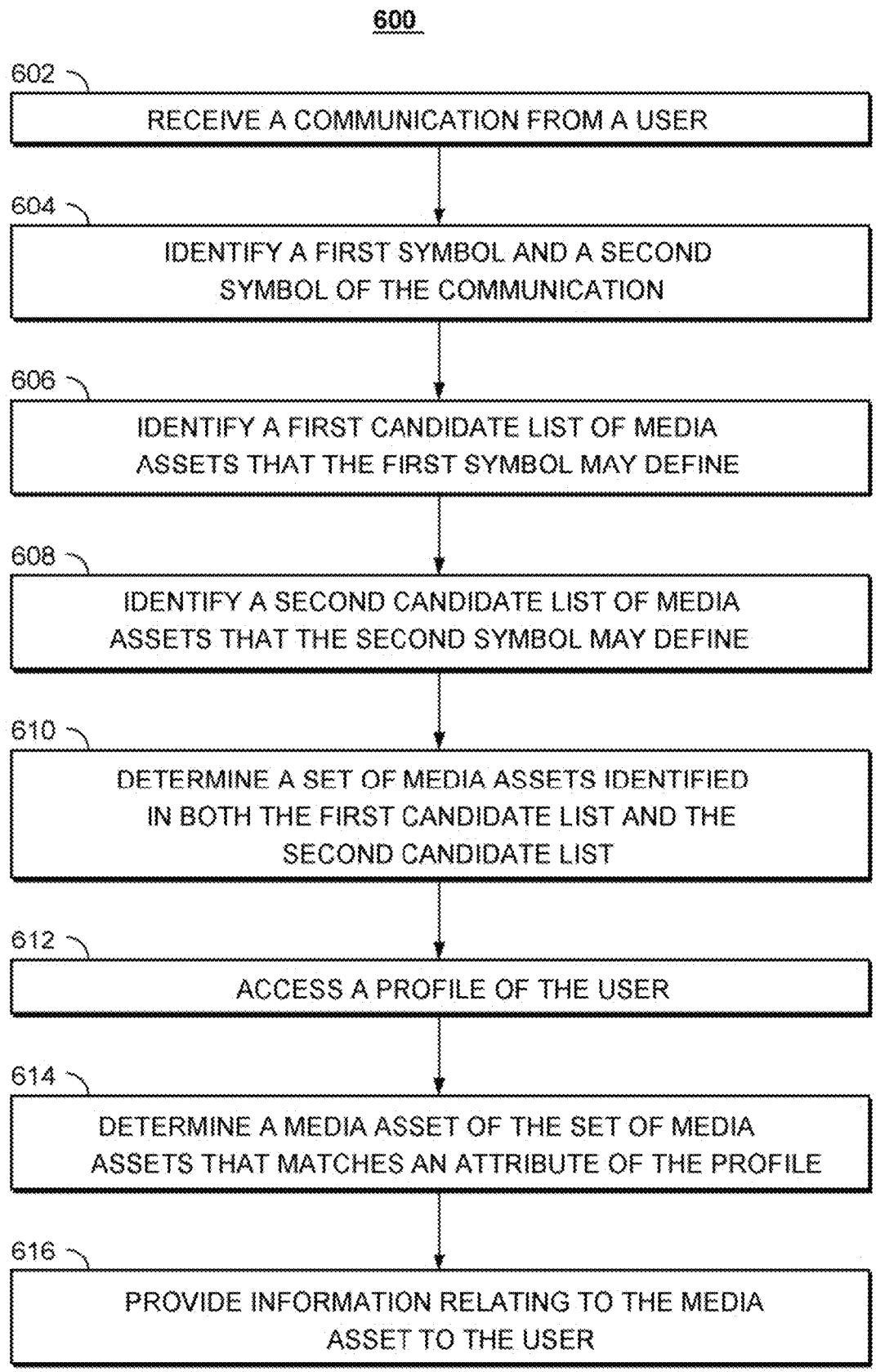
FIG. 6 is a flowchart of illustrative steps involved in providing information to a user based on a first symbol and a second symbol in accordance with some embodiments of the disclosure.

FIG. 6 is a flowchart 600 of illustrative steps involved in providing information to a user based on a first symbol and a second symbol, in accordance with some embodiments of the disclosure. It should be noted that the process 600 or any step thereof could be performed on, or provided by, any of the devices shown in FIGS. 3-5. For example, process 600 may be executed by processing circuitry 304 (FIG. 3) as instructed by processing circuitry implemented on user equipment 402, 404, and/or 406 (FIG. 4) in order to provide information to a user. In addition, one or more steps of process 600 may be incorporated into or combined with one or more steps of any other process or embodiment.

At 602, the media guidance application receives, using processing circuitry 306, a communication (e.g., communication 502) from the user. The communication may be an SMS, MMS, e-mail, voice message, or any other type of communication as described above. In some embodiments, the media guidance application receives the communication 502 through the communications network 414. For example, the media guidance application may be implemented on a television set-top box, and the user communication 502 may be sent by the user on a cell phone. In some embodiments, the media guidance application may be implemented on the same user device 402, 404, or 406 as the user device the user uses to send the communication 502.

At 604, the media guidance application identifies a first symbol and a second symbol of the communication 502. The media guidance application may identify the first symbol and second symbol by using heuristics stored in the storage circuitry 308. For example, the media guidance application may use a heuristic that nouns and associated adjectives will form a symbol. If a user sends, using user input interface 310, an e-mail with the text "I like listening to loud male voices sing soft romantic songs," the media guidance application may use heuristics stored in the storage circuitry 308 and processing circuitry 306 to identify "loud male voices" and "soft romantic songs" as the first and second symbol. In some embodiments, the media guidance application may convert the communication 502 to a textual representation before identifying the first symbol and the second symbol. For example, if the user communication 502 is a voicemail left on a friend's answering machine, the media guidance application may transcribe the text of the voicemail before identifying the first symbol and the second symbol. In some embodiments, the media guidance application may identify more than two symbols of the communication 502.

At 606, the media guidance application may identify, using processing circuitry 306, a first candidate list of media assets that the first symbol may define. The media guidance application may use a database that contains media assets with tags associated with each of the media assets to identify the first candidate list. The media guidance application may compare the tags associated with each of the media assets in the database to the first symbol, and add media assets to the first candidate list based on the result of the comparison. In some embodiments, the tags may be associated with the media assets by the media guidance application based on information parsed from user reviews of media assets. In some embodiments, the tags may be associated with the media assets based on information provided by the media content source 416 or media guidance data source 418. The database may be continuously updated by the media guidance application based on communications from sources 416 or 418 through the communications network 414. For example, if a user communication 502 contains the symbol "handsome actor", the media guidance application may identify a first candidate list of media assets, each of which has user reviews talking about the handsome actor in the respective media asset.

At 608, the media guidance application may identify, using processing circuitry 306, a second candidate list of media assets that the second symbol may define. The media guidance application may identify the second candidate list in the same manner as described with respect to 606.

The media guidance application may identify any number of candidate lists of media assets, such that each candidate list of media assets is associated with an identified symbol. For example, if the media guidance application identifies three symbols, it may also identify three candidate lists of media assets.

At 610, the media guidance application may determine, using processing circuitry 306, a set of media assets identified in both the first candidate list and the second candidate list. In some embodiments, the media guidance application may determine that a media asset in the set of media assets is available from multiple sources. Nevertheless, the media asset may only appear once in the set of media assets. For example, the first candidate list may contain a movie being broadcast on a television channel, while the second candidate list may contain a movie available for streaming online. The media guidance application may determine that the movie appears on both candidate lists, and add the movie to the set of media assets. The media guidance application may later provide information about the movie being available from two sources to the user. The media guidance application may determine a set of media assets that appear in all candidate lists of media assets if the media guidance application identified more than two candidate lists of media assets.

At 612, the media guidance application may access, using processing circuitry 306, a profile of the user. This profile may be available on the Internet, and the media guidance application may access it using communications network 414. The profile may be created by the media guidance application by combining user information from a variety of sources. For example, the media guidance application may access a profile of the user that is created by combining information from the user's social media webpage (e.g., a user profile on Facebook) with a list of television shows the user has watched in the last month.

At 614, the media guidance application may determine a media asset of the set of media assets that matches an attribute of the profile. The media guidance application may select an attribute of a plurality of attributes of the user profile by ranking the user profile attributes and then selecting the most highly ranked attribute. For example, the media guidance application may rank a user profile comprised of media assets the user has accessed in chronological order, so media assets the user has recently accessed are ranked higher than media assets accessed earlier. In another example, the media guidance application may rank most frequently accessed media assets higher. In another example, the media guidance application may rank media assets accessed by the most users higher. This ranking will allow the media guidance application to select an attribute of the user profile that is relevant to the user's current preferences. In some embodiments, if the set of media assets does not contain a media asset that matches the most highly ranked attribute of the profile, the next ranked attribute of the profile may be selected and compared by the media guidance application to each of the set of media assets. In some embodiments, if multiple media assets have the same ranking, the tie may be broken by the media guidance application assigning random ranks to the tied media assets.

In some embodiments, the media guidance application may compare each media asset in the set of media assets to a plurality of attributes. The media guidance application may calculate, using processing circuitry 306, a correlation associated with each media asset. A higher correlation indicates the media asset matches the user profile attribute to a greater degree than a media asset with a lower correlation. The media guidance application may then select the media asset with the highest correlation to provide information to the user about with respect to 616.

In some embodiments, the media guidance application may determine that more than one media asset matches an attribute of the profile, and provide information about more than one media asset to the user with respect to 616.

At 616, the media guidance application provides information relating to the media asset to the user (e.g., by way of pop-up 504, displayed by way of display 312). In some embodiments, the media guidance application may provide the information in response to receiving the user communication 502, in the form of a pop-up 504 or in any other form as described in relation to FIG. 5. In some embodiments, the media guidance application may provide the information by replacing a default advertisement with a targeted advertisement at a later time. The media guidance application may provide information to the user on any of the user devices 402, 404, or 406 that are associated with the user.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increate the speed of the system or method.

Figure 7:
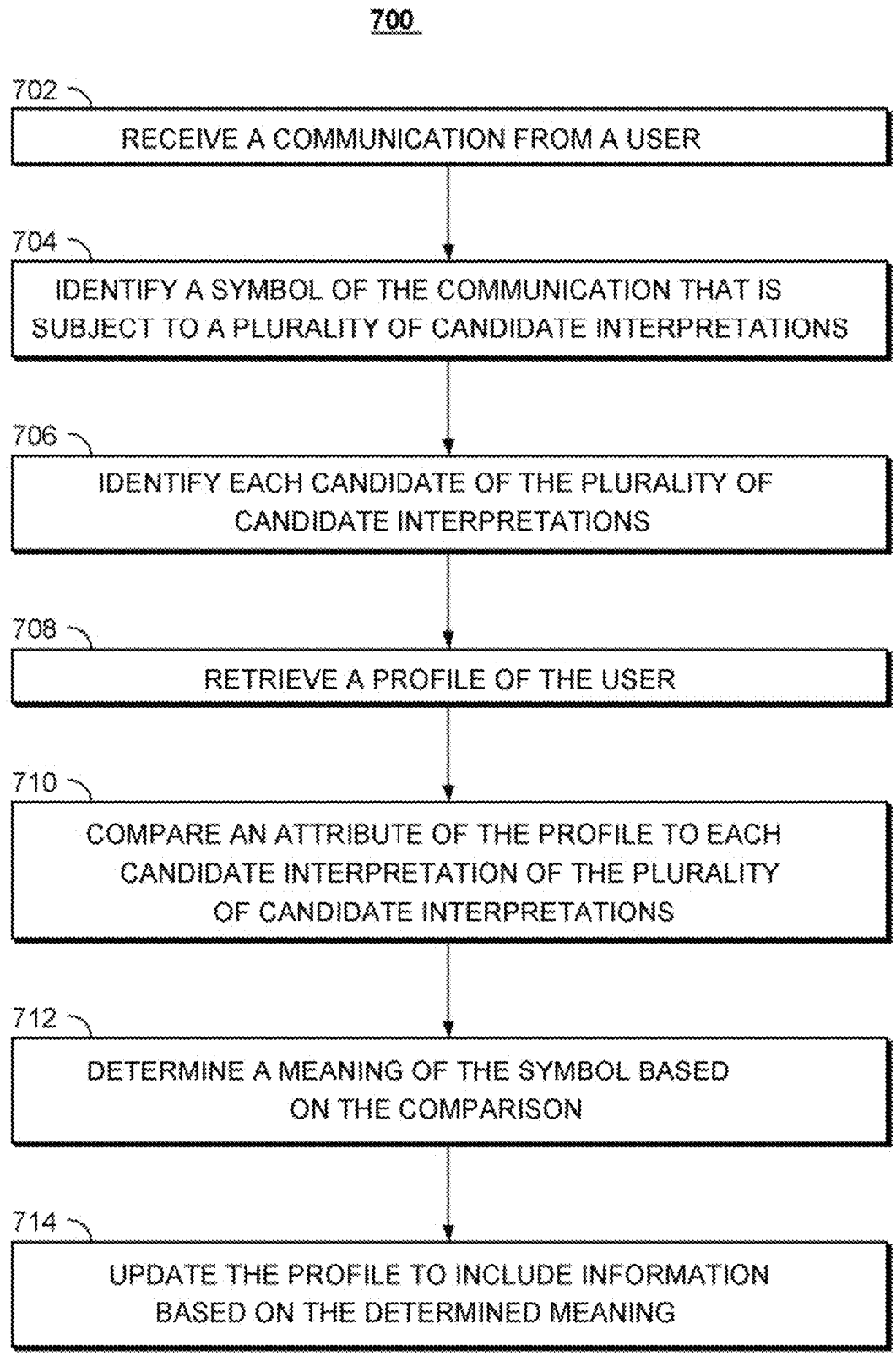
FIG. 7 is a flowchart of illustrative steps involved in providing information to a user based on a symbol that is subject to a plurality of candidate interpretations in accordance with some embodiments of the disclosure.

FIG. 7 is a flowchart 700 of illustrative steps involved in providing information to a user based on a symbol that is subject to a plurality of candidate interpretations in accordance with some embodiments of the disclosure. It should be noted that the process 700 or any step thereof could be performed on, or provided by, any of the devices shown in FIGS. 3-5. For example, process 700 may be executed by processing circuitry 304 (FIG. 3) as instructed by processing circuitry implemented on user equipment 402, 404, and/or 406 (FIG. 4) in order to provide information to a user. In addition, one or more steps of process 700 may be incorporated into, or combined with, one or more steps of any other process or embodiment.

At 702, the media guidance application receives a communication (e.g., communication 502, input by way of user input interface 310) from a user, as described with respect to 602.

At 704, the media guidance application identifies, using processing circuitry 306, a symbol of the communication 502 that is subject to a plurality of candidate interpretations. The media guidance application may determine that the symbol is subject to a plurality of candidate interpretations based on a comparison of the symbol to media assets in a database. The media guidance application may compare the symbol to the media assets in the database as described in relation to 606. In some embodiments, the symbol may be a homonym.

The media guidance application may identify more than one symbol subject to a plurality of candidate interpretations. The media guidance application may execute steps 706-714 for each identified symbol. In some embodiments, the media guidance application may execute steps 706-714 for the first symbol, and then the second symbol, and so on until all the steps have been executed for all symbols. In some embodiments, the media guidance application may execute the steps for each symbol in parallel.

At 706, the media guidance application identifies, using processing circuitry 306, each candidate interpretation of the plurality of candidate interpretations. The media guidance application may create a list of candidate interpretations based on the results of the comparison of the symbol with the media assets in the database. In some embodiments, each candidate interpretation may be associated with a media asset. In some embodiments, the media guidance application may consolidate candidate interpretations. For example, if the symbol is "CSI", the media guidance application may identify several candidate interpretations corresponding to episodes of "CSI: Miami" and several candidate interpretations corresponding to episodes of "CSI: Crime Scene Investigation". The media guidance application may determine that these candidate interpretations can be consolidated to generate a list of two candidate interpretations: "CSI: Miami" and "CSI: Crime Scene Investigation".

At 708, the media guidance application retrieves a profile of the user, as described with respect to 612.

At 710, the media guidance application compares, using processing circuitry 306, an attribute of the profile to each candidate interpretation of the plurality of candidate interpretations. In some embodiments, the media guidance application may do this as described with respect to 614.

At 712, the media guidance application determines a meaning of the symbol based on the comparison. Using a candidate interpretation from 710 that matches the attribute, the media guidance application may determine that the meaning of the symbol is the candidate interpretation. In some embodiments, if more than one candidate interpretation matches the attribute, the media guidance system may calculate correlation values for each of the matching candidate interpretations and select the candidate interpretation with the highest correlation as the meaning of the symbol.

At 714, the media guidance application updates, using processing circuitry 306, the profile to include information based on the determined meaning. The media guidance application may update the profile to include a meaning of the symbol that can be easily accessed the next time the media guidance application identifies the symbol in a user communication 502. For example, the media guidance application may receive a user communication (e.g., communication 502) containing the symbol "Go Giants!" and determine that this symbol could refer to two sports teams—the San Francisco Giants and the New York Giants. The media guidance application may then use a location attribute from the user's profile or a user device 402, 404, or 406 that states that the user lives in San Francisco and compares this attribute to each of the candidate interpretations of sports teams. The media guidance application may update the user profile to indicate that when user communication 502 contains the symbol "Go Giants!", the user is referring to the baseball team San Francisco Giants and not the football team New York Giants. The updated user profile may be used by the media guidance application to provide information to the user as described with respect to 616.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increate the speed of the system or method.

Figure 8:
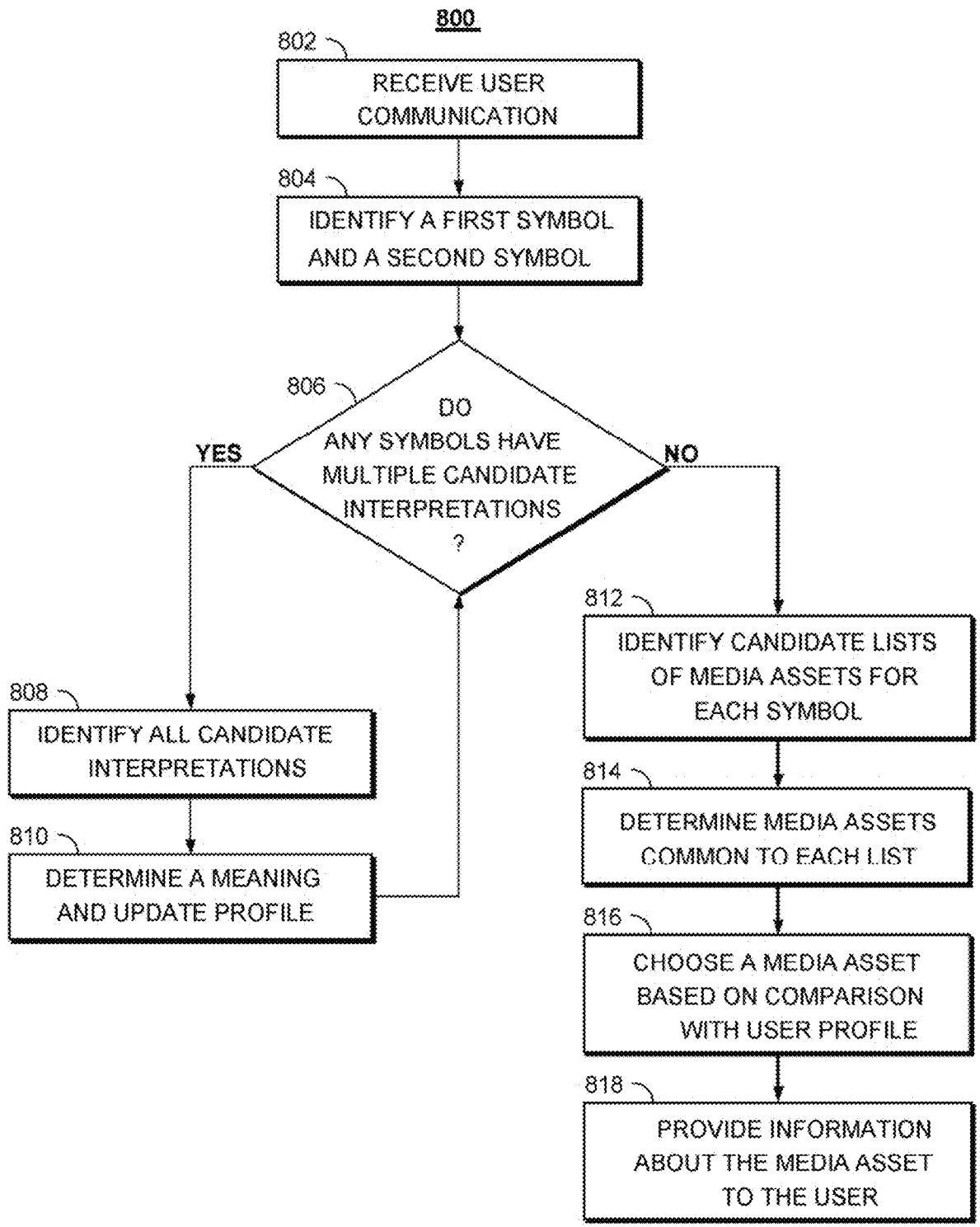
FIG. 8 is a flowchart of illustrative steps for providing information to a user based on a communication including two symbols, at least one of which may have multiple candidate interpretations, in accordance with some embodiments of the disclosure.

FIG. 8 is a flowchart 800 of illustrative steps for providing information to a user based on a communication 502 including two symbols, at least one of which may have multiple candidate interpretations, in accordance with some embodiments of the disclosure. Flowchart 800 shows one possible embodiment of the present embodiment combining features of flowchart 600 and flowchart 700. It should be noted that the process 800 or any step thereof could be performed on, or provided by, any of the devices shown in FIGS. 3-5. For example, process 800 may be executed by processing circuitry 304 (FIG. 3) as instructed by processing circuitry implemented on user equipment 402, 404, and/or 406 (FIG. 4) in order to provide information to a user. In addition, one or more steps of process 800 may be incorporated into or combined with one or more steps of any other process or embodiment.

At 802, the media guidance application receives user communication (e.g., communication 502, received by way of user input interface 310) as described with respect to 602.

At 804, the media guidance application identifies a first symbol and a second symbol as described with respect to 604. In some embodiments, the media guidance application may identify more than two symbols of the communication.

At 806, the media guidance application determines, using processing circuitry 306, if either or both of the first symbol and the second symbol have a plurality of candidate interpretations. The media guidance application may determine that either the first symbol or the second symbol has a plurality of candidate interpretations as described with respect to 704. In some embodiments, the media guidance application may determine if any of more than two identified symbols are subject to a plurality of candidate interpretations.

If the result of the determination at 806 is that a symbol has a plurality of candidate interpretations, the media guidance application identifies all candidate interpretations at 808, as described with respect to 706. The media guidance application then determines a meaning for the symbol and updates a user profile. This may be done by the media guidance application through the process described with respect to 708, 710, 712, and 714. The media guidance application then returns to 806 to determine if any of the remaining symbols have multiple candidate interpretations. Once a meaning has been determined for all candidate interpretations, the media guidance application can move on to 812.

If the result of the determination at 808 is that all symbols have a determined meaning or only one candidate interpretation, the media guidance application identifies candidate lists of media assets for each symbol with respect to 812, as described with respect to 606 and 608. At 814, the media guidance application determines media assets common to each list, as described in 610. At 816, the media guidance application chooses a media asset based on a comparison with a user profile, as described with respect to 612 and 614. At 818, the media guidance application provides information (e.g., by using pop-up 504, which may be displayed via display 312 or audibly transmitted by way of speakers 314) about the media asset to the user, as described with respect to 616.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increate the speed of the system or method.

Although processes for providing information to a user based on a first symbol and a second symbol have been described in reference to only two symbols, it is understood that the processes may provide information to a user based on more than two symbols. Though processes for providing information to a user based on a symbol with a plurality of candidate interpretations have been described in reference to one symbol, it is understood that the processes may provide information to a user based on more than one symbol, each with a plurality of candidate interpretations.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   receiving, by input/output circuitry, a communication from a user;
   accessing a schedule from a media guidance data source;
   identifying a first media asset based on a first interpretation of the communication and a second media asset based on a second interpretation of the communication;
   determining, based on the schedule, that the first media asset is scheduled to be available earlier than the second media asset; and
   based on determining that the first media asset is scheduled to be available earlier than the second media asset, providing a recommendation for the first media asset to the user.

2. The method of claim 1, further comprising:
   based on the first media asset being scheduled to be available earlier than the second media asset, providing the first media asset.

3. The method of claim 1, further comprising:
   determining that the communication from the user includes a name and an indication that the name refers to a person; and
   based on the determining that the communication from the user includes the name and the indication that the name refers to the person, identifying the first interpretation and second interpretation for the communication from the user by identifying a first person's name and a second person's name that match the name from the communication from the user.

4. The method of claim 3, further comprising:
   determining whether the first person's name is associated with the first media asset that is scheduled to be available for the user; and
   in response to determining that the first person's name is associated with the first media asset that is scheduled to be available for the user, adding the first person's name to the first interpretation.

5. The method of claim 1, wherein providing the recommendation to the user comprises:
   determining that the first interpretation of the communication from the user comprises a title of the first media asset;
   identifying the second media asset that has a title similar to the title of the first media asset and is scheduled to be available earlier; and
   providing information indicative of the second media asset to the user.

6. The method of claim 1, wherein providing the recommendation for the first media asset comprises varying a presentation scheme of an identifier of the first media asset, wherein varying the presentation scheme comprises at least one of modifying a color scheme or modifying size of text.

7. A system comprising:
   input/output circuitry configured to:
      receive a communication from a user; and
   control circuitry configured to:

access a schedule from a media guidance data source;
identify a first media asset based on a first interpretation of the communication and a second media asset based on a second interpretation of the communication;
determine, based on the schedule, that the first media asset is scheduled to be available earlier than the second media asset;
wherein the input/output circuitry is further configured to:
based on determining that the first media asset is scheduled to be available earlier than the second media asset, provide a recommendation for the first media asset to the user.

8. The system of claim 7, wherein the input/output circuitry is further configured to:
based on the first media asset being scheduled to be available earlier than the second media asset, provide the first media asset.

9. The system of claim 7, wherein the control circuitry is further configured to:
determine that the communication from the user includes a name and an indication that the name refers to a person; and
based on the determining that the communication from the user includes the name and the indication that the name refers to the person, identify the first interpretation and second interpretation for the communication from the user by identifying a first person's name and a second person's name that match the name from the communication from the user.

10. The system of claim 9, wherein the control circuitry is further configured to:
determine whether the first person's name is associated with the first media asset that is scheduled to be available for the user; and
in response to determining that the first person's name is associated with the first media asset that is scheduled to be available for the user, adding the first person's name to the first interpretation.

11. The system of claim 7, wherein the control circuitry is configured to identify the first media asset based on the first interpretation of the communication and the second media asset based on a second interpretation of the communication by:
determining that the first interpretation of the communication from the user comprises a title of the first media asset;
identifying the second media asset that has a title similar to the title of the first media asset and is scheduled to be available earlier; and
wherein the input/output circuitry is configured to provide the recommendation by providing information indicative of the second media asset to the user.

12. The system of claim 7, wherein the input/output circuitry is configured to provide the recommendation for the first media asset by varying a presentation scheme of an identifier of the first media asset, wherein varying the presentation scheme comprises at least one of modifying a color scheme or modifying size of text.

13. A non-transitory computer readable medium comprising:
instructions that when executed by an input/output circuitry cause the input/output circuitry to:
receive a communication from a user; and
instructions that when executed by a control circuitry cause the control circuitry to:
access a schedule from a media guidance data source;
identify a first media asset based on a first interpretation of the communication and a second media asset based on a second interpretation of the communication;
determine, based on the schedule, that the first media asset is scheduled to be available earlier than the second media asset; and
instructions that when executed by the input/output circuitry further cause the input/output circuitry to:
based on determining that the first media asset is scheduled to be available earlier than the second media asset, provide a recommendation for the first media asset to the user.

14. The non-transitory computer readable medium of claim 13, further comprising instructions that when executed by the input/output circuitry causes the input/output circuitry to based on the first media asset being scheduled to be available earlier than the second media asset, provide the first media asset.

15. The non-transitory computer readable medium of claim 13, further comprising instructions that when executed by the control circuitry causes the control circuitry to:
determine that the communication from the user includes a name and an indication that the name refers to a person; and
based on the determining that the communication from the user includes the name and the indication that the name refers to the person, identify the first interpretation and second interpretation for the communication from the user by identifying a first and a second person's name that match the name.

16. The non-transitory computer readable medium of claim 15, further comprising instructions that when executed by the input/output circuitry causes the input/output circuitry to:
determine whether the first person's name is associated with the first media asset that is scheduled to be available for the user; and
in response to determining that the first person's name is associated with the first media asset that is scheduled to be available for the user, add the first person's name to the first interpretation.

17. The non-transitory computer readable medium of claim 13, wherein the instructions that cause the control circuitry to identify the first media asset based on the first interpretation of the communication and the second media asset based on a second interpretation of the communication cause the control circuitry to:
determine that the first interpretation of the communication from the user comprises a title of the first media asset;
identify the second media asset that has a title similar to the title of the first media asset and is scheduled to be available earlier; and
wherein the instructions that cause the input/output circuitry to provide the recommendation cause the input/output circuitry to provide information indicative of the second media asset to the user.

18. The non-transitory computer readable medium of claim 13, wherein the instructions that cause the input/output circuitry to provide the recommendation for the first media asset cause the input/output circuitry to vary a presentation scheme of an identifier of the first media asset, wherein varying the presentation scheme comprises at least one of modifying a color scheme or modifying size of text.

* * * * *